US012301715B2

(12) United States Patent
Sangle-Ferriere

(10) Patent No.: US 12,301,715 B2
(45) Date of Patent: May 13, 2025

(54) RENEWAL OF ONE-TIME KEYS

(71) Applicant: Bruno Sangle-Ferriere, Paris (FR)

(72) Inventor: Bruno Sangle-Ferriere, Paris (FR)

( * ) Notice: Subject to any disclaimer, the term of this patent is extended or adjusted under 35 U.S.C. 154(b) by 311 days.

(21) Appl. No.: 17/103,507

(22) Filed: Nov. 24, 2020

(65) Prior Publication Data

US 2021/0176057 A1    Jun. 10, 2021

(30) Foreign Application Priority Data

Dec. 4, 2019    (FR) ...................... 1913754

(51) Int. Cl.
| | |
|---|---|
| *H04L 9/08* | (2006.01) |
| *H04L 9/06* | (2006.01) |
| *H04L 9/14* | (2006.01) |
| *H04L 9/16* | (2006.01) |
| *H04L 9/32* | (2006.01) |
| *H04L 9/40* | (2022.01) |
| *H04L 12/28* | (2006.01) |

(52) U.S. Cl.
CPC .............. *H04L 9/14* (2013.01); *H04L 9/0656* (2013.01); *H04L 9/083* (2013.01); *H04L 9/088* (2013.01); *H04L 9/0891* (2013.01); *H04L 9/0894* (2013.01); *H04L 9/16* (2013.01); *H04L 9/3236* (2013.01); *H04L 12/2814* (2013.01); *H04L 63/067* (2013.01); *H04L 9/0863* (2013.01); *H04L 2012/285* (2013.01)

(58) Field of Classification Search
CPC ... H04L 9/14; H04L 9/08; H04L 9/088; H04L 9/083; H04L 9/0894; H04L 9/0656; H04L 9/06; H04L 9/0863; H04L 9/32; H04L 9/3236; H04L 9/0891; H04L 63/06; H04L 63/067; H04L 63/061; H04L 63/062; H04W 12/04; H04W 12/0433

See application file for complete search history.

(56) References Cited

U.S. PATENT DOCUMENTS

| | | | |
|---|---|---|---|
| 5,124,117 A | 6/1992 | Tatebayashi et al. | |
| 5,675,648 A | 10/1997 | Townsend | |
| 5,907,620 A | 5/1999 | Klemba et al. | |
| 6,072,876 A | 6/2000 | Obata et al. | |
| 8,369,529 B1* | 2/2013 | Agarwal | H04L 9/16 380/278 |
| 2003/0026431 A1 | 2/2003 | Hammersmith | |
| 2005/0125502 A1* | 6/2005 | Fambon | H04L 69/329 709/213 |

(Continued)

FOREIGN PATENT DOCUMENTS

WO    2018031750 A1    2/2018

OTHER PUBLICATIONS

Menezes et al., "Handbook of Applied Cryptography", p. 546-547 and 551, Jan. 1, 1997; XP002301330.

*Primary Examiner* — Shaqueal D Wade-Wright
(74) *Attorney, Agent, or Firm* — IPSILON USA, LLP

(57) ABSTRACT

A method for securing communication within a system includes at least one server and at least two appliances able to communicate with the server and with each other. A pair of appliances communicating together, and having at least one shared one-time encryption key for securing communication between the two, has at least one other shared one-time encryption key supplied by the server following the connection of only one of the two appliances to the server.

19 Claims, 9 Drawing Sheets

(56) References Cited

U.S. PATENT DOCUMENTS

| | | | |
|---|---|---|---|
| 2005/0226420 A1* | 10/2005 | Makela | H04L 9/0891 380/270 |
| 2008/0165972 A1* | 7/2008 | Worthington | H04L 9/083 380/278 |
| 2012/0087495 A1* | 4/2012 | Revell | H04L 9/0841 380/47 |
| 2018/0183774 A1* | 6/2018 | Campagna | H04L 9/3247 |

* cited by examiner

FIG. 2

| | Procedure for synchronizing one-time keys between an appliance and the server | Procedure for reversing the role of the keys | Procedure for transferring keys | Procedure for placing new one-time keys on an appliance from a server | Procedure for sending a message signed by one device to another device | Method for encrypted communication between two devices for sending a long message | Link |
|---|---|---|---|---|---|---|---|
| Procedure for synchronizing one-time keys between an appliance and the server | | | | | | | appliance-server |
| Procedure for reversing the role of the keys | TRUE | | | | | | device-appliance |
| Procedure for transferring keys | TRUE | | | | | | device-appliance |
| Procedure for placing new one-time keys on an appliance from a server | 1 | 1 | | | | | appliance-server |
| Procedure for sending a message signed by one device to another device | 1 | TRUE | 1 | | | | device-appliance |
| Method for encrypted communication between two devices for sending a long message | | | | TRUE | | | device-appliance |

FIG. 3
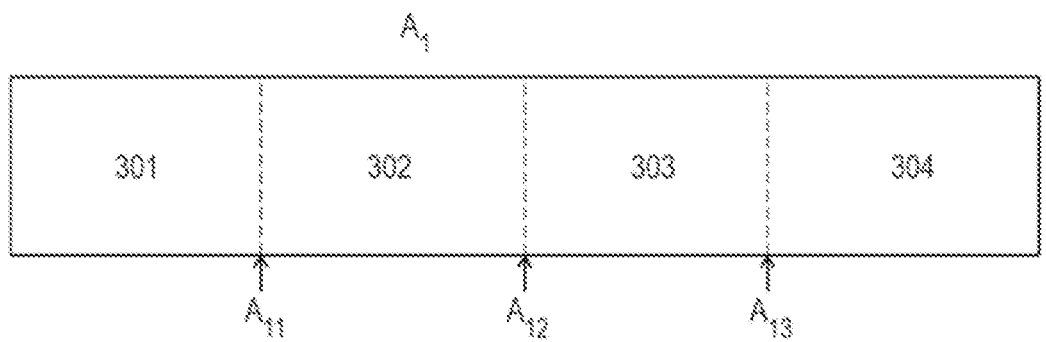
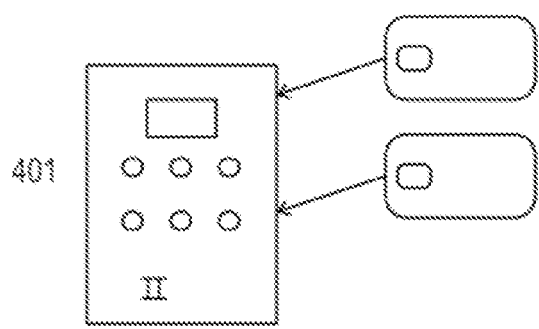
FIG. 4
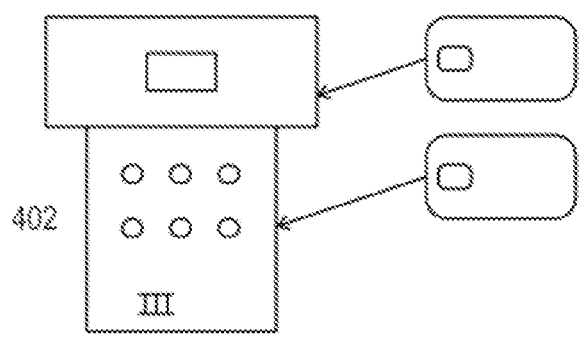

RENEWAL OF ONE-TIME KEYS

TECHNICAL FIELD

The present invention relates to digital cryptography and to the security of computer and electronic devices.

BACKGROUND

Computers and electronic appliances are often connected to a network, physically, wirelessly, by RFID, or by any other secure or unsecure means, and sometimes need to recognize the identity of the appliance that has sent them some data, for example, in order to ensure that these data are not transmitted by another appliance, which may have intercepted and modified them before resending them to the legitimate recipient, or quite simply to definitively identify the sender of the data.

To this end, some software is often installed on each of the appliances intended for communication, said software encrypting or signing the data, so that said encrypted or signed data can be transmitted to the other appliance over an unsecure line. The term "sign" the data is understood to mean hashing said data, followed by encryption of the hashed data.

The encryption is intended to ensure that the encrypted data can only be decrypted by devices provided with the suitable encryption key, and the signature allows the receiving device to verify the identity of the device sending the data by comparing the hash originating from the decrypted signature to the hash that it can recompute on the basis of the received data.

The encryption and signature software often use symmetric and asymmetric cryptographic keys, as well as encryption and decryption algorithms. Such encryption and signature algorithms nevertheless are mainly based on the difficulty, and even the impossibility, of having the computing power required to recompute an encryption key, with this power often being greater than the power provided by mainstream consumer computers. However, the computing power of computers is constantly increasing and also can be considerably enhanced by using multiple computers executing the same task. Sometimes, cryptography specialists also find means for reducing the power required for finding encrypted keys by using mathematical properties adapted to certain algorithms. Finally, the advent of quantum computers risks making all these algorithms and keys obsolete, with quantum computers being designed for the high-speed resolution of equations, such as searching for the encryption key used for the signature.

It therefore becomes necessary for one-time keys to be used for securing the exchange of data between two devices. These keys can only be used once or a limited number of times in order to provide the exchanged data with a certain degree of confidentiality, since changing the keys will often increase the cost involved in them being recomputed by computer hackers. If the keys change often enough, the time needed to recompute them is too long to become a problem with respect to the security of the system using them, in particular when the receiving peripheral has enough time to verify the identity of the sender and act upon it before the signature key is recomputed or, if the confidentiality of the encrypted data is no longer necessary, after the encryption key has been found.

Furthermore, encryptions using keys with a number of bits that is at least equal to the number of bits of the data to be encrypted can be undecipherable.

The use of one-time keys by electronic devices requires a significant amount of memory and requires the presence of keys on each of the two communicating devices, but these can be deleted therefrom after they are used.

U.S. Pat. No. 5,907,620 relates to a cryptographic method providing a uniform cryptographic function that operates in a manner that is compatible with various national, regional or industrial cryptographic policies.

U.S. Pat. No. 6,072,876 discloses a method for filing a private key used in the RSA cryptosystem, capable of keeping the private key in a more secure manner, without stipulating that a user always has a storage medium.

U.S. Pat. No. 5,675,648 discloses a communication method using quantum cryptography, in particular certain physical quantum properties of the transmission photons.

U.S. Pat. No. 5,124,117 relates to a method and a system using a protocol for establishing a secure secret secured between two or more terminals via a network.

US application 2005/0226420 discloses a data communication network comprising at least two terminal equipments that are used to manage a set of indexed encryption keys, and of these, the first terminal equipment is at least one transmitter and the second terminal equipment is at least one receiver. Operation of this communication method in an unsecured environment is only possible if there is control of the users having access to the local network.

SUMMARY

A requirement exists for further improving the security of systems by supplying one-time encryption keys to each pair of elements that may need to exchange data with complete confidentiality.

The aim of the invention is to particularly respond to this requirement, and it achieves this aim by virtue of a method for securing communication within a system comprising at least one server and at least two appliances able to communicate with the server and with each other, with the communication between the two appliances occurring securely using a one-time encryption key shared with the two appliances, in which method, after said key is used, a one-time encryption key that is not used but that is already present on one of the two appliances is sent by the server to the other appliance, after said appliance has connected to said server, with a view to a subsequent secure communication between the two appliances.

A further aim of the invention is a method for securing communication within a system comprising at least one server and at least two appliances able to communicate with the server and with each other, wherein a pair of appliances communicating together and having at least one shared one-time encryption key for securing communication between the two has at least one other shared one-time encryption key supplied by the server following the connection of only one of the two appliances to said server.

Preferably, the first appliance connects in an insecure environment to the server and gets from the server an encrypted copy of an encryption key, initially assigned for securing communication between the server and the second appliance, in order to be used for securing communication between the two appliances.

Throughout the remainder of the description, the term "one-time key" will be used and will denote a one-time encryption key.

The terms "encryption/encrypt" and "encrypting" are interchangeable.

A key is formed by a number that is advantageously computer coded by a series of bits, with the number of bits forming the key being its size.

The expression "send a plain message" means sending a message without encrypting said message. Any message described as being sent as a plain message nevertheless also can be, as an alternative, without this being restated, encrypted using a conventional encryption method that does not require the used key to be changed for each transmission.

Preferably, the one-time encryption key that is not used but is present on one of the two appliances is initially randomly generated by the server, for example, a quantum random number generator, then recovered by this appliance after it is connected to the server.

Preferably, the method according to the invention is used to exchange messages where said at least one server and said at least two appliances keep their last sent message of the same type, other than an acknowledgement of receipt, in a memory and using a one-time key, until they have received an acknowledgement of receipt for said message.

In the present invention, two types of messages are defined, the first type relates to the messages transferring, from a first device to a second device and in addition to any information, enough keys required to send an acknowledgement of receipt of said message sent by the first device to the second device, with the second type consolidating any other message; the number of keys required to send an acknowledgement of receipt being the number of keys required to sign said acknowledgement of receipt, optionally increased by the number of keys required to compile the acknowledgement of receipt, and in particular the number of keys used for the possible encryption of information contained in said acknowledgement of receipt.

Said at least one server and said at least two appliances preferably keep a register of the acknowledgements of receipt sent following the reception of the last message of the same type, so that they can resend said acknowledgement of receipt if they need to receive the same message again.

Preferably, said at least one server and said at least two appliances also keep a register of the messages corresponding to the retained acknowledgements of receipt, or another means of acknowledging said messages, such as their hash, so as to be able to verify whether a received message has already resulted in the preparation of an acknowledgement of receipt.

Preferably, the registers modified by the creation and the signing of a message, including the register containing a last sent message that has not received an acknowledgement of receipt, are modified at the same time.

The registers that must be modified when a message is received, including the register containing the acknowledgement of receipt and the means for acknowledging the message corresponding to said acknowledgement of receipt, are preferably modified at the same time.

A further aim of the invention, according to another one of its aspects, is two versions of a system for implementing the method according to the invention.

The keys in the first version of the invention are placed one after the other in a register, forming a list, with each of the keys preferably being referenced by its place in the list; the place of a key can be the count of keys preceding said key in the list, or even, on the contrary, the count of the following keys, or any other method for locating numbers, with said list preferably being expandable, since keys can be added thereto, for example, and dynamic, since keys that have been used at the start or the end of the list are preferably deleted therefrom.

The keys in the second version of the invention are placed on a register, with each of the keys comprising a unique identifier, said list preferably being expandable, since keys can be added thereto, and dynamic, since the used keys can be deleted therefrom. The keys can have different sizes.

Registers

The system comprises a set of registers, with a register being defined by a memory location, inside a processor or, preferably, a persistent memory location, such as a flash memory, that retains the information despite the appliance being turned off. These registers are preferably physically and logically protected so that the information found therein cannot be modified or copied by an element outside the system.

Whilst some registers used by the invention have the same functions in the two versions, some, associated with the keys, have functions that are specific to each version. Each register is given a name beginning with S for a register of the server or beginning with A for a register of the appliance, with some registers therefore existing in the two versions of the invention, whilst others are only present in only one of its versions.

The invention allows one-time keys to be organized into different sets placed on registers within the system, guaranteeing the security of the communication and facilitating the synchronization of the keys between the various elements of the system, and also relates to a protocol for using these keys.

Registers Specific to the First Version

According to the invention, the system can comprise at least one of the following:

a register S1 for each appliance, but located on the server, containing an ordered list of random numbers associated with the appliance, said numbers being able to be used as shared one-time keys for securing communication between the appliance and the server and one-time keys used to secure communications between the appliance and another appliance; thus, there are as many lists (registers S1) as there are appliances; the keys located at the start of a list are preferably used to encrypt data sent to the appliance or even assigned to encrypt and decrypt data exchanged by the appliance with another appliance, while the keys located at the end of a list are preferably used to decrypt data originating from the appliance. In another alternative embodiment of the invention, the system can have a plurality of servers and each appliance then has as many registers A1 as there are servers;

at least one register S3 for each appliance, but located on the server, containing, for the appliance, a reference of keys assigned to secure communication between the appliance and another appliance, said references preferably being accompanied by copies in the register S39 of the extracts from the registers S1 that they denote. The reference can indicate from which register S1 of the first or second appliances the key is extracted, as well as its location in said register S1 and the amount of numbers it is made up of, as well as, if there is more than one server in the system, the reference of the server holding said register S1;

a register S11 for each appliance, but located on the server, comprising the reference of the first key of the register S1 that has not yet been either used or assigned to communicate between appliances;

a register S12 for each appliance, but located on the server, comprising the reference of the first key of the register S1 assigned to decrypt data originating from the appliance;

a register S13 for each appliance, but located on the server, preferably comprising the last key of the register S1 assigned to decrypt data originating from the appliance that has not already been used;

at least one register S31 for each appliance, but located on the server, associated with each register S3 comprising the reference of the first key of the register S3 that has not yet been used by the appliance;

at least one register S32 for each appliance, but located on the server, associated with each register S3 comprising the reference of the first key of the register S3 assigned to decrypt data received from the other appliance if the first keys of the register S3 were assigned to encrypt, or even assigned to encrypt if the first keys of the register S3 were assigned to decrypt;

at least one register S33 for each appliance, but located on the server, associated with each register S3 comprising the reference of the last key of the register S3 located after the key indicated by the register S32 and that has not yet been used;

a register A1, located on each appliance, containing an ordered list of random numbers that can be used as shared one-time keys for securing communication between the appliance and the server and one-time keys used to secure communications between the appliance and another appliance, the keys located at the start of the list are preferably used to decrypt data originating from the server or even assigned to encrypt and decrypt data exchanged by the appliance with another appliance, while the keys located at the end of the list are preferably used to encrypt data sent to the server;

at least one register A3, located on each appliance, containing one or more lists of references of keys assigned to secure communication between the appliance and another appliance, said keys being extracted from the register A1 of the appliance or from the register A1 of the other appliance, said references preferably being accompanied by copies on the register A39 of the extracts from the registers A1 that they denote. The reference indicates whether the key is extracted from the register A1 of the appliance or even from the register A1 of the other appliance, as well as its location in said register A1 and the amount of random numbers that it is made up of If the system has a plurality of servers, the reference also indicates the identifier of the server associated with the register S1;

a register A11, present on each appliance, comprising the reference of the first key of the register A1 that has not yet been either used or assigned to communicate between appliances;

a register A12, present on each appliance, comprising the reference of the first key of the register A1 (starting from the start of said register) assigned to encrypt data sent to the server;

a register A13, present on each appliance, comprising the reference of the last key of the register A1, starting from the start of said register, assigned to encrypt data sent to the server, which key has not already been used;

at least one register A31, present on each appliance, associated with each register A3 comprising the reference of the first key of the register A3, starting from the start of said register, which key has not yet been used;

at least one register A32, present on each appliance, associated with each register A3 preferably comprising the first key of the register A3, starting from the start of said register, assigned to decrypt data sent to the other appliance;

at least one register A33, present on each appliance, associated with each register A3 comprising the last key of the register A3, starting from the start of said register, assigned to decrypt data originating from the other appliance and that has not already been used, the decryption keys being extracted from the end of the list.

Registers Specific to the Second Version

The system according to the invention can comprise at least one of the following:

a set S1' for each appliance, but present on the server, of one-time keys used either to communicate between the server and said at least two appliances or to communicate between said at least two appliances, each key having an identifier S11' and a randomly generated number S10';

at least one set S3' for each appliance, but present on the server, of identifiers of one-time keys used to communicate between two appliances, a copy of said key being able to be found on the register S39', and, if the system comprises a plurality of servers, the identifier of the server holding the register SF from which the key is extracted;

a set A1', present on each appliance, of one-time keys used to communicate between the server and the relevant appliance or to communicate from this appliance with at least one other appliance, each key having an identifier A11' and a randomly generated number A10'. In another alternative embodiment of the invention, the system can have a plurality of servers and each appliance then has as many registers A1' as servers;

at least one set A3', present on each appliance, of identifiers of one-time keys used to communicate between the relevant appliance and another appliance, optionally accompanied by said key;

preferably, each one-time key belonging to the set SF, respectively A1', has a first flag S17' (respectively A17') indicating whether the key has already been used and a second flag S18' (respectively A18') indicating whether the identifier of the key is present on the set S3', respectively A3', and a third flag S12' (respectively A12') indicating whether the key is used to encrypt the messages on the server or even to decrypt them.

The set S1' can contain different sizes of one-time keys. The size of a one-time key, for example, expressed as the number of bits, is preferably greater than or equal to the size of the data that it encrypts.

The sets S3' containing identifiers of one-time keys used to communicate between two appliances are preferably organized so that the key identifiers are sorted by the identifier of the first appliance, with optional indices allowing rapid access to the information relating to the second appliance, or information even can be duplicated, with the identifiers of the two being reversed for the duplicated version.

The date and time of use of each key also can be recorded.

The set A1' of an appliance preferably contains the same information as the set S1' of the server, but it is limited to the communication of keys used or to be used by said appliance. The sets A3' of an appliance preferably contain the same information as the sets S3' of the server, but it is limited to the communication of keys used or to be used by said appliance.

Preferably, each one-time key identifier belonging to the set A3' has a flag A32' indicating whether the key is used to encrypt messages on said device or even to decrypt them.

Registers Shared by the Two Versions

The system according to the invention can comprise at least one of the following:

- preferably, for each appliance, a register S14 located on the server, comprising the total number of keys of the register S1 or S1';
- two registers S15 and S15bis for each appliance, but located on the server, each comprising a message sent to the appliance that has not occurred upon receipt of an acknowledgement of receipt originating from said appliance, whereas such an acknowledgement of receipt was requested; with the register S15bis being reserved for messages containing the keys allowing the appliance receiving said message to send an acknowledgement of receipt;
- two registers S16 and S16bis for each appliance, but located on the server, comprising an acknowledgement of receipt of messages, as well as an identifier of the message that it relates to, such as the message itself, or preferably its hash, the register S16bis being reserved for the acknowledgements of receipt of messages containing the keys allowing the appliance receiving said message to send an acknowledgement of receipt;
- at least one register S30 for each appliance, but located on the server, associated with each register S3 made up of a flag indicating whether the key originates from the register S1 or S1' of the appliance or even if it originates from the register S1 or S1' of the other appliance, as well as the identifier of the same key on this same register S1 or S1';
- a register S2 for each appliance, but located on the server, containing the identifier of the appliance to which the set of registers associated with said appliance refers;
- a register S4 for each appliance, but located on the server, containing operating statistics for one-time keys and, preferably, for each other appliance the optimal number of one-time keys to be associated with the other appliance. This optimal number can be determined by the server or the appliance and can, for example, be a multiple of the number of times the two appliances have communicated during the last week, plus the number of times the two appliances have communicated during the last three weeks, plus a fixed number; this fixed number that can depend on each pair of appliances can be, for example, greater for the appliances that are considered to be located in the same geographical zone. The set S4 of the server can contain, in a non-limiting manner, for each appliance, the identifiers of the other appliances with which said appliance has already communicated during a given period, as well as the number of one-time keys used, during the current week or the last three weeks. The appliances can also comprise a register A4 comprising key usage and communication statistics, including their date and time of use;
- preferably, a register S5 for each appliance, but located on the server, containing a list of identifiers of other appliances that must be removed from the register A3 or A3' of the appliance when the appliance next connects to the server, said identifiers could have been added to this list, for example, for security reasons to prevent the appliances of the system from communicating with said at least one other appliance. The appliance can also comprise a register A5 containing this information;
- preferably, at least one register S34 for each appliance, but located on the server, associated with each register S3 or S3' comprising the total number of keys of the register S3 or S3';
- at least one register S35 for each appliance, but located on the server, associated with each register S3 or S3' indicating whether this register S3 has been copied onto the appliance;
- at least one register S36 for each appliance, but located on the server, associated with each register S3 or S3' indicating whether this register S3 or S3' has been copied onto the other appliance;
- preferably, each one-time key identifier belonging to the set S3 or S3' has a flag S37 indicating whether the key must no longer be used;
- at least one register S38 for each appliance, but located on the server associated with each register S3 or S3', indicating the identifier of the other appliance and, preferably, a register S38bis indicating the identifier of a third appliance, the key of the corresponding register S3 being, if this register is not empty, dedicated to the communications between the other appliance and the third appliance, and not between the appliance and the other appliance, and that must be communicated by the appliance to the other appliance;
- preferably, two registers S42 and S42bis for each appliance, but located on the server, associated with each other appliance used as a flag for indicating whether or not a request for keys or for the role reversal of keys, respectively intended for or originating from the other appliance, must be signed;
- a register A2, present on each appliance, containing an identifier of the relevant appliance;
- preferably a register A14 present on each appliance comprising the total number of keys of the register A1;
- two registers A15 and A15bis present on each appliance each comprising a message sent to the server that did not occur upon receipt of an acknowledgement of receipt originating therefrom, whereas such an acknowledgement of receipt was requested;
- two registers A16 and A16bis present on each appliance each comprising an acknowledgement of receipt of messages, as well as the message to which it refers or alternatively its hash;
- a register A30 made up of a flag indicating whether the key originates from the register S1 or S1' of the appliance or even if it originates from the register S1 or S1' of the other appliance, as well as the identifier of the same key on this same register S1 or S1';
- preferably a register A34 present on each appliance associated with each register A3 comprising the total number of keys of the register A3 or A3';
- preferably, a register A35 present on each appliance associated with each register A3 containing a 'server' flag indicating whether one of the other registers associated with the register A3 or A3' has been modified since the last connection of the relevant appliance to the server;
- preferably, a register A36 present on each appliance associated with each register A3 or A3' comprising a flag indicating whether the register A3 or A3' is present on the other appliance;

preferably, each one-time key identifier belonging to the set A3 or A3' having a flag A37' indicating whether the key must no longer be used;

a register A38 present on each appliance associated with each register A3 or A3' comprising the identifier of the other appliance with which the register A3 or A3' is associated, and preferably a register A38bis indicating the identifier of a third appliance, the register A3 then being, if this register is not empty, dedicated to securing communication between the third appliance and the other appliance, the identifier of which is registered in the register A38;

two registers A40 and A40bis present on each appliance and associated with each other appliance each comprising a message sent to the other appliance that did not result in the receipt of an acknowledgement of receipt originating from said other appliance, whereas such an acknowledgement of receipt was requested; the message preferably being associated with the identifier of the appliance receiving the message. The register A40bis preferably can contain a message transferring or reversing keys allowing the appliance receiving said message to acknowledge receipt thereof;

a register A41 and another register A41bis present on each appliance and associated with each other appliance each comprising an acknowledgement of receipt of messages, as well as the messages to which they refer, or alternatively their hash; the register A41bis preferably can contain the acknowledgement of receipt of a key transfer message;

preferably two registers A42 and A42bis associated with each other appliance or with the server used as a flag for indicating whether or not a request for keys or for the role reversal of keys, respectively intended for or originating from the other appliance, must be signed.

The set of registers can be arranged otherwise on the server and/or said appliances, whilst allowing the aforementioned information to be extracted therefrom.

Each of the above lists can be arranged so that the registers, in particular those occupied by the random numbers that are used, can be deleted or reassigned to similar or different uses. The registers containing random numbers can contain, for example:

sub-registers comprising pages or portions of pages of random numbers each pointing to the following or preceding pages or portions of pages and for which the first bit included on each page or each portion of a page indicates if the portion of a page or the page can be deleted;

another sub-register containing the address of the first and last pages that cannot be deleted, as well as an indication allowing the random numbers to be found that correspond to the location to which the registers A11, A12, A13, A31, A32 or A33 refer.

In this case, the count of the random numbers contained in each register will preferably count the deleted numbers as still being present, other registers advantageously can be introduced to count the number of keys actually present on the registers S1, S3, A1 or A3.

The appliance and the server can contain other registers optionally updated during their use, such as indices, allowing their consultation and their own updating to be accelerated. The server or the appliance also can comprise procedures allowing the series of random numbers contained in pages to be moved to other pages, if this operation allows various pages of random numbers that are not used to be consolidated on the same page and thus free up pages that then can be reused.

Summary table of the registers

| Function | Server | Appliance | Server | Appliance |
|---|---|---|---|---|
| Server-appliance keys | S1 | A1 | S1' | A1' |
| Appliance identifier | S2 | A2 | S2 | A2 |
| Appliance-appliance keys | S3 | A3 | S3' | A3' |
| Key usage statistics | S4 | A4 | S4 | A4 |
| List of identifiers of appliances to be deleted from A3 or A3' | S5 | A5 | S5 | A5 |
| Random number of the key | no | no | S10' | A10' |
| Identifier of the key | no | no | S11' | A11' |
| Key originating from the other appliance? | S30 | A30 | S30 | A30 |
| Copy of the random number of the key originating from S1 or S1' | S39 | A39 | S39 | A39 |
| Place of the first key of S1 neither used nor assigned | S11 | A11 | no | no |
| Key of S1' used? | no | no | S17' | A17' |
| Key of S1' sent on S3? | no | no | S18' | A18' |
| Place of the first key for decryption in S1 | S12 | A12 | no | no |
| Key for decryption in S1'/A1'? | no | no | S12' | A12' |
| Place of the last key of S1 assigned to decrypt and not used | S13 | A13 | no | no |
| Total number of keys in S1 or S1' | S14 | A14 | S14 | A14 |
| Last message sent server-standard appliance without received AR | S15 | A15 | S15 | A15 |
| Last message sent server-appliance (with key for AR) without received AR | S15bis | A15bis | S15bis | A15bis |
| Last AR of the standard message | S16 | A16 | S16 | A16 |
| Last AR of a sent message (with keys for AR) | S16bis | A16bis | S16bis | A16bis |
| Ref. of the location of the first key of S3 that is not used | S31 | A31 | no | no |
| Key used? | S37 | A37 | S37 | A37 |
| Place of the first key for decryption of the register S3 | S32 | A32 | no | no |

-continued

Summary table of the registers

| Function | Server | Appliance | Server | Appliance |
|---|---|---|---|---|
| Place of the last key of S3 assigned to decrypt and not used | S33 | A33 | no | no |
| Amount of random numbers in the register S3 | S34 | A34 | S34 | A34 |
| Key used for decryption | no | no | S32' | A32' |
| Copy flag on the appliance | S35 | N/A | S35 | N/A |
| Register A3 modified since last sync with the server | no | A35 | no | A35 |
| Copy flag on the other appliance | S36 | A36 | S36 | A36 |
| Identifier of the other appliance | S38 | A38 | S38 | A38 |
| Identifier of a third appliance | S38bis | A38bis | S38bis | A38bis |
| Last message sent to an appliance | N/A | A40 | N/A | A40 |
| Last message sent with a key for AR without received AR | N/A | A40bis | N/A | A40bis |
| Last AR sent to an appliance | N/A | A41 | N/A | A41 |
| Last AR sent to an appliance for a message with a key for AR | N/A | A41bis | N/A | A41bis |
| Does a request to send a key need to be signed? | S42 | A42 | S42 | A42 |
| Does a received key request need to be signed? | S42bis | A42bis | S42bis | A42bis |

Means for Transmitting Between Devices

Data compression and decompression algorithms can be respectively used for sending and receiving any data exchanged between two elements of the system.

The steps relating to sending and receiving data can be performed using the same communication protocol, or using different communication protocols; said protocols can be, for example, in a non-exclusive manner, a wired transmission or a transmission through contactors allowing a wired link to be established, a non-wired transmission e.g. Wi-Fi, 4G, 5G, WiMAX, Lora or Sigfox.

Groups of Appliances

Mediator Appliances

The servers and appliances can be configured, according to the invention, to limit the secure communications between some appliances by only associating one-time keys with pairs of appliances complying with certain rules, such as, in a non-limiting manner, pairs of appliances authorized to securely communicate, or groups of appliances authorized to communicate together. The use, in particular of mediator appliances, such as "dual-readers", that must be introduced into a communication between two standard appliances, actually enables a reduction in the number of pairs of appliances for which the communications need to be secured; with the mediator appliances and the standard appliances then each belonging to two different groups. If there are n standard appliances only communicating with the mediator appliances and the server and N mediator appliances communicating together, with the server and with each standard appliance, the number of links to be secured, including the links with the server, are:

$$(N+n)+N*n+N*(N-1)/2,$$

whereas if the standard appliances communicate directly with each other, there are $$n+n*(n-1)/2=n*(n+1)/2$$

links to be secured; if, for example, there are x mediator appliances for one standard appliance, the ratio between the number of links to be secured and the number of links to be secured if there is no mediator appliance is, if n is large, comparable to $$2x+x^2.$$

Therefore, the invention allows, through the use of a small x, substantial savings in terms of the number of keys to be provided on the appliances, and in particular on the standard appliances; indeed, x can be very small if the mediator appliances are, for example, cash machines, with the standard devices being credit cards, or only small if the mediator appliances are, for example, portable appliances allowing communication between two standard appliances, with said standard appliances being in a credit card format.

Groups Per Regions or Groups of Users

In another configuration, the standard appliances can all directly communicate together within the same group, but also can all communicate with a group of shared mediators. Such a configuration can be used for money transfer uses, directly from appliance-to-appliance within the same country, with the appliances being, for example, in the format of a calculator with a keyboard, but requiring a mediator, such as an appliance in the format of a merchant payment terminal in order to operate abroad.

Groups Per Groups of Users with Use of Mediators

In yet another configuration, the appliances can belong to three types of groups: the appliances of the groups of the first type that can communicate together, within the same group through the use of a mediator belonging to groups of the second type, or even by a mediator belonging to a single group of the third type. The groups of the first type can be, for example, smart cards from the same country containing registers for accounting sums of money or representing official or commercial documents and requiring secure communications between them to transmit said documents or sums of money between appliances; the second type of groups then being groups of readers from the same country allowing the smart cards from the country to communicate with each other and to read the information that they hold, and the appliances from the group of the third type allowing mutual communication of the appliances from any group of the first type and the information thereon to be read, the appliances of the third group being, for example, owned by the banks, foreign exchange offices or merchants around the world that can have foreign clients. The number of appliances of the second type and of the third type can be kept low if they only contain information that can be lost, then can be excluded from their group, for example, on the initiative of the system operator, whilst retaining the possibility of securely communicating with the server.

Devices

Some procedures described in this invention sometimes communicate between two appliances, sometimes between an appliance and a server, sometimes between an appliance and both a server and an appliance. A device denotes an object that equally can be a server or an appliance.

Encryption

A predictable encrypted message sent by an appliance or server over an unsecure line can be intercepted, and the encryption keys then can be computed, then reused, by a malicious party not to encrypt another message, with this malicious party having no interest in keeping a message that they are aware of secret, but to sign, with the authentic keys of an appliance, a message that they have written. Furthermore, the malicious party does not need to have the chance to predict the exact message, but they simply need to be able to limit the potential universe of the sent messages or even to be able to limit the universe of the messages sent to a potential universe (i.e., for which the likelihood of the message belonging thereto is significant) of sent messages, since they can then predict, from these potential universes of sent messages, the potential universes of keys that they can use to form encrypted messages that they can send one after the other to an appliance of the system, until said system accepts one of said messages; with the likelihood of success within a reasonable period of said method then also being significant.

However, the system can use sets of distinct keys for encrypting messages that can be predicted, sets of keys for using the signatures between appliances, with this set of keys being technically similar to the set of keys intended for signatures for communications between appliances, but reserved for encrypting data between appliances insofar as these encrypted communications are also signed so that any encryption key is only used by the system once.

Alternatively, data can be encrypted between appliances so that it does not reveal the keys used if it is intercepted encrypting a message that can be predicted. This is possible if the encryption is performed using at least two keys successively encrypting the exchanged data. For example, a first key encrypting a message a first time, then a second key encrypting this encrypted message. The interception of such a predictable message encrypted several times nevertheless can indicate a link between the keys used.

Therefore, the encryption of predictable messages is preferably performed by using an encryption function that is successively applied, preferably twice, to the whole message with one-time keys, the size of which is at least equal to that of the message and which are extracted from the same set of keys as the keys assigned to the signatures between appliances, said keys preferably being used by the system only once to perform such encryption. However, the XOR function also can be used as an encryption function, as can a symmetric or asymmetric encryption function such as, for example, AES, Blowfish, DES, Triple DES, Serpent, or Twofish using the one-time key or any other combination or encryption function. Two different functions also can be used for each of the two successive encryption operations. The sent information encrypted by a one-time key is preferably preceded by plain identifiers of the keys used for the encryption. If the encrypted message is longer than the keys available for such encryption, several keys also can be used to form, once concatenated, a single large key. In this case, the identifier of the key used for the encryption must contain the identifiers of all the keys that are used.

The encryption of messages that cannot be predicted is performed, preferably using an XOR function applied once to the message to be encrypted with a one-time key that is the same size as the message, or alternatively by another encryption function, such as ES, Blowfish, DES, Triple DES, Serpent, or Twofish using the one-time key or any other combination or encryption function.

Signatures

Modern cryptography currently uses 'signatures' that are used to verify whether data originates from a known transmitter of the appliance that receives the data. These signature techniques often use systems of asymmetric keys. In the invention, and in order to overcome any weaknesses associated with the use of asymmetric keys, signature systems are preferably used that use one-time keys.

The signature of a message that cannot be predicted, from the encryption of a number that has been randomly generated, for example, can be less complex than the signature of a message that can be predicted by a third party. Indeed, knowledge of the message and its signature can provide information relating to the one-time key used by the signature and therefore optionally allow the third party to intercept the message and its signature, then replace them with others that are also signed. A message can be predicted by intercepting it, but also by making assumptions relating to its composition: for example, if the message involves reading a meter, said reading can be predicted or even randomly selected from one of the few possible readings of said meter.

The signature of a message that cannot be predicted therefore is preferably formed by a hash encrypted by a one-time key concatenated with the identifier of said key.

The signature of a message that can be predicted is preferably formed from the encryption of a number that has been randomly generated by the message sender and from the encryption of the hash of a combination of the message to be signed and of the number randomly generated by the transmitter concatenated with the identifiers of the two keys used for the encryptions. The signature can be verified by decrypting the random number, then recombining it with the signed message, then verifying that the hash of this combination is definitely the decryption of the received hash. The signature then requires the use of two one-time keys: one for encrypting the random number, the other for encrypting the hash.

The random number can be replaced by a one-time key, which then no longer needs to be encrypted and which is not incorporated, except for its identifier, in the signature; the signature is then formed from the encryption of the hash of the message combined with a one-time key, concatenated with the identifier of said one-time key and with the identifier of the one-time key used to encrypt the hash.

Encrypted is understood to mean encryption of the element encrypted by a one-time key preceded or followed by the identifier of said key.

Combining two elements is understood to be any message formed by two combined elements, such as, for example, one concatenated with the other or one encrypted by a symmetric encryption method using the other for a key.

Acknowledgement of Receipt

The Benefit of Having Acknowledgements of Receipt for Ordinary Messages

The invention implements procedures involving conveying identifiers of keys from an appliance or a server to another appliance and also marking keys as used. An electronic appliance outside the system thus could maliciously request that an appliance or a server of the system sends them signed or encrypted messages solely in order to exhaust the available reserve of one-time keys from the appliance of the system. They could also intercept sent or signed encrypted messages intended for an appliance of the system or of the server in order to resend the initial message and thus help to exhaust the reserves of keys. Therefore, the system is preferably designed so that the appliances or the server do not resend an ordinary message, i.e. a message that is not an acknowledgement of receipt, using one-time keys to the same appliance or to the same server, before receiving an acknowledgement of receipt of the preceding ordinary message. In order to limit the number of keys present on each appliance for communicating with each of the other appliances of the system, the system nevertheless can allow a signed message to be sent from a first appliance to a second appliance, even if the second appliance does not necessarily have keys for sending an acknowledgement of receipt. The first appliance, if it wishes to be able to subsequently add keys to the second appliance that will allow it to send an acknowledgement of receipt, therefore must, if possible, be able to send a key transfer message, even if it has not yet received the acknowledgement of receipt of the preceding message. Two types of ordinary messages are then identified, the first being that of the messages capable of transferring information and transferring keys required to resend an acknowledgement of receipt, the second type consolidating all the other ordinary messages. The messages of the same type preferably are only sent if the preceding message of the same type itself has occurred upon receipt of an acknowledgement of receipt; the key transfer messages can transfer enough keys to add the necessary keys to the acknowledgements of receipt, said transfer messages can be of the same type. The term transfer keys is understood herein to mean sending another appliance the one-time key references allocated by the server for securing communications with said other appliance.

Retention of Sent Messages Until the Acknowledgement of Receipt is Received

Preferably, the appliances and servers keep their last sent message of the same type in a memory until an acknowledgement of receipt has been received for said message.

Retention of the Last Sent Acknowledgement of Receipt

Preferably, the appliances and servers keep a register of the acknowledgements of receipt that were sent following the receipt of the last message of the same type, so that they can resend said acknowledgement of receipt should they receive the same message again. Preferably, the appliances and servers also keep a register of the messages corresponding to the retained acknowledgements of receipt, or alternatively another means for acknowledging said messages, such as their hash, so as to be able to verify whether the received message has already led to the preparation of an acknowledgement of receipt.

Deletion of the Last Sent Acknowledgement of Receipt

A device, by writing a new acknowledgement of receipt, deletes the previously sent acknowledgement of receipt from its register. Furthermore, if a message is received that requires an acknowledgement of receipt to be sent, but the appliance receiving said message does not have enough keys to acknowledge receipt thereof, an unsigned acknowledgement of receipt is registered in the register of the last acknowledgement of receipt and the reference of the message to which it refers is registered in the register provided to this end, without the unsigned acknowledgement of receipt being sent. This allows the appliance that receives new keys to sign, then send the acknowledgement of receipt of a previously received message for which no acknowledgement of receipt has yet been sent.

Content of the Acknowledgement of Receipt Message

The acknowledgement of receipt preferably will be a signed message. It will preferably contain an identifier of the message for which it acknowledges receipt, with this identifier being able to be the hash of said message. The acknowledgement of receipt can also contain other information, such as a response to the sent message, information relating to the status of the system, or information for transferring or reversing the role of keys, with the role of a key being, according to the device on which it is located, either to encrypt or to decrypt a message.

Concomitance Between the Writing of the Received Message and the Registration of its Acknowledgement of Receipt In order to prevent the same message from attempting to modify the same registers several times, if the server or even the appliance receiving a message has to modify their registers following the receipt of said message, all these modifications preferably will be confirmed when the acknowledgement of receipt is registered in the register provided to this end, whether or not this acknowledgement of receipt is signed.

Verification of the Modification of the Register of Another Device

In order to ensure that any modification of a register initiated by a first device, appliance or a server has already been taken into account by a second device to which it has sent a message other than an acknowledgement of receipt, the first device verifies that it has definitely received the acknowledgement of receipt of the preceding message that it sent to the second device.

In the Event of an Error Detected in the Encryption

The messages sent from an appliance or a server to another appliance or a server can be intercepted and modified, which can cause inconsistencies or attempted frauds to appear when said messages are received. These messages even can be intercepted, modified and sent thus to the other appliance or server numerous times. However, if the message is made up of a large enough encrypted random number, for example, on 128 bits, or even if the random number used to form the signature in the case of 'predictable' messages is big enough, for example, 128 bits, the time needed to decode a significant number of false messages transmitted to the appliance, such that at least one of the fraudulent messages has one chance in a million of not being recognized by the appliance as fraudulent, will be, if said appliance can perform 1 billion verifications per second, of the order of $4 \cdot 10^{18}$ days. If, alternatively, the time allocated to compute the decryption is limited, for example, to $\frac{1}{100}$th of a second following the transmission of a command sent to the appliance by the user when they press a button, and is limited to, for example, 1 second per day in total, then, using 64 bit keys, 50 years of use of the appliance would be required so that it has one chance in 1 million of accepting a fraudulent message as non-fraudulent that will be sent thereto during all the operating times of its encryption processor. The appliance or the server receiving such fraudulent messages, thus preferably will not mark the keys used for said message as fraudulent. However, they can send a message other than an acknowledgement of receipt to notify the other appliance or server that it receives such messages.

The Keys

Role Assigned to the Keys

Two appliances, or even one appliance and one server, can send messages to each other simultaneously, i.e. before having received the message sent by the other appliance or server, and therefore without knowing which keys have already been used by the other appliance or server. In order to avoid two appliances or servers from exchanging messages using the same keys, the system according to the invention is preferably organized so that the unused keys are, on each appliance, identifiable as keys that can be used to encrypt data as opposed to decrypt data. This identification preferably will be reversible, with an appliance or a server being able to mark any key or any group of keys initially identified as reserved for encryption, as reserved for decryption and to notify the other appliance or server as such through a message that is preferably signed and optionally encrypted, with said appliance identifying, upon receipt of said message, the key or the group of keys as being available for the encryption.

This change of identification of keys preferably will be performed following a plain request sent by the other appliance or server, but also can be performed spontaneously or following an encrypted, then signed, or signed, then encrypted request. The appliance or the server advantageously can verify, before performing such a change, that it will still have at least one key that can be used to send a signed acknowledgement of receipt to the next message that it will receive. Preferably, the appliance or the server will not change the marking of a sufficient number of keys reserved for encryption with the other device in order to provide the number of keys required to respond to or to acknowledge receipt of a possible future message.

Location of the Keys

The invention allows the server to assign keys to a second appliance that are already found on a first appliance. Therefore, situations can occur where keys have been used by an appliance to encrypt or sign a message without the second appliance, which is the recipient of said message, having been notified that the first appliance can use these keys. The keys used by the first appliance then will not be found in the register A3 or A3' of the second appliance, but in its register A1 or A1' of keys that can be used to encrypt the communications with the server. An appliance verifying a signature or decrypting a message can use such keys placed on the registers A1 or A1' and can confirm the signature, as if the one or more keys used acquired keys from the register A3 or A3' that were dedicated to communications with another appliance.

Key Transfer Message

The key transfer messages allow new keys to be conveyed to appliances or even allow another appliance to be notified that a particular key is dedicated to communication with another appliance, or to change the role of a key assigned to decrypt to a key assigned to encrypt. In order to prevent a lack of keys in the appliance receiving such a key transfer message for transmitting an acknowledgement of receipt of said message, these messages each preferably transfer a number of keys that is at least enough for the appliance receiving said message to be able to resend an acknowledgement of receipt.

Request for Keys

The invention allows the server to assign keys to a second appliance that are already found on a first appliance. Therefore, situations can occur where keys have been assigned to a second appliance without the first appliance having been notified as such and where the first appliance wishes to communicate with the second appliance without knowing which key it can use to secure said communication. For this reason, or for any other reason, the first appliance preferably can make a plain request, which may or may not be signed, for lists of one-time keys shared with the two appliances. This request optionally can be matched with an ideal number of required keys, but also with a minimum number of required keys. The second appliance receiving such a request for key identifiers sends a message in response, which is preferably signed, but also is optionally encrypted, containing the identifiers of the required keys. In order to prevent malicious appliances from continuously requesting keys to be transferred to a third appliance, a mechanism for limiting the number of transferred keys can be introduced. Such a mechanism can involve a limited number of keys, for example, ten, that can be transferred following a first request received by a third device. Any subsequent request then must be signed, with the appliances and servers retaining the information indicating whether the request must be signed on the registers S42, S42bis, A42, or A42bis. If the key request is signed, the keys can be transferred to the acknowledgement of receipt message.

Marking the Use of the Keys

The keys used to encrypt a message are preferably marked as used by the appliance that encrypts the data, then upon receipt of the message by the appliance that decrypts them. Preferably, the role assigned to a used key cannot be modified. The marking, in particular for the first version of the invention, can be implemented by the relative position of said key relative to a dynamic cursor, with the cursor separating the used keys from keys that have not yet been used.

In the first version of the invention, a key used for encryption is marked as used by modifying its associated register S11, A11 or A31; a key used for decryption is marked as used by modifying its associated register S13, A13 or A33. Preferably, the registers S35 and S37 or A37 are also activated.

In its second version, a key used for encryption or even for decryption is marked as used by modifying its usage flag S17', A17', S37 or A37, with this modification preferably being accompanied by the activation of the server flag.

Non-Parallel Procedures

The secure communication procedures described hereafter are preferably accessed in a centralized manner to prevent two concurrent processes accessing the same key registers from being able to, for one process, send keys to an appliance or server, whilst the other process requests to receive keys from the same appliance or server.

Concomitance

Some electronic appliances offer the possibility of making the modifications of a plurality of registers concomitant. The preparation and the sending of messages between various appliances and servers sometimes requires modification of the registers described in this system and the prepared message being registered in a register containing a last sent message that has not received an acknowledgement of receipt.

In order to prevent these registers from being modified again if the message has to be prepared again, the registers modified by the creation and the signing of a message, including the register containing a last sent message that has not received an acknowledgement, are preferably modified at the same time.

Similarly, the received messages can result in the modification of registers, including the register containing the last acknowledgement of receipt. The registers that must be modified when a message is received, including the register containing a last message for which an acknowledgement has been sent, are preferably modified at the same time.

Procedures

Procedure for Allocating and Synchronizing One-Time Keys for Communicating Between Appliances Through an Unsecure Link The invention also relates to a procedure for allocating and synchronizing one-time keys for communicating between appliances through an unsecure link, with the purpose of this synchronization being to install one-time keys on the appliance that allow it to communicate with other appliances, the appliance and the server belonging to a system, the method comprising:

1. preferably, the appliance establishing, on the basis of its set A3 or A3' of keys dedicated to security between appliances, a set of one-time key identifiers, the 'server flag' A35 of which is activated;
2. preferably, registering, in the register A15 of the appliance, a signed message containing identifiers of the set established in the preceding step, as well as the information (A31, A32, A33, A34, A36, A37 or A32', A36 and A37) relating to the register A3 or A3', the server flag of which is activated, then sending said message;
3. when the appliance receives an acknowledgement of receipt, deleting its register A15;
4. when the appliance receives new one-time keys originating from the server: verifying the signature of the received message, as well as decrypting the received keys and marking as used the keys used for signing and encrypting, and registering received keys in the register A3 or A3' and their related registers (A31 to A38 or A32', A34, A37 and A38) of the appliance;
5. registering an acknowledgement of receipt in the register A16 of the appliance, then sending said acknowledgement of receipt to the server.

These exchanges are preferably performed as plain exchanges, accompanied by a signature of the appliance or of the server sending the information, said signature being verified by the appliance receiving said information, the keys received in step 4 preferably being encrypted using one-time keys of the register S1 or S1' used to encrypt the communications between the appliance and the server.

Steps 3 and 4 can be repeated several times if the appliance receives several messages holding keys.

The method preferably comprises, between steps 2 and 3:
following the reception of the key identifiers of the set established in step 1, verifying the signature of the message, the server updating its set S3 or S3', as well as the registers S30, S31, S32, S33, S34, S36, S37 or S32', S36 and S37 and S4 and sending an acknowledgement of receipt;

then, between steps 2 and 4:
i. using, among others, the set S4, and taking into account the keys S1 required on the server to sign the message being prepared and taking into account the fact that any key transmitted from a register S1 of another appliance will need the same size key from the register S1 of the appliance in order to be encrypted, the server computes or re-computes an optimal number of one-time keys to be used by the appliance to communicate with each of the other appliances; this number can correspond, for example, to a certain multiple of the number of keys used in the last week, increased by the number of keys used in the last month if this number is greater and further increased by a constant, once computed this number can be registered on this same register S4;
ii. the server using this optimal number and the computation, on the basis of the registers S31, S32, S33 and S34 or S37, for each other appliance, of the number of one-time keys not used, in order to determine the number of keys to be associated with the appliance for communicating with each other appliance of the system, in addition to the keys that have already been associated therewith to this end;
iii. the server associating one-time keys with the appliance that are present on the sets S1 or S1' of the other appliances identified in the preceding step and with which said appliance must obtain new communication keys, with this association of keys by the server preferably involving: 1) adjusting the registers S3, or S3', S31, S32, S33, S34, S35 and S38 of the other appliances in order to take into account newly assigned keys, as well as the registers S11 or S17' of the other appliances in order to reflect the availability of the keys to other appliances, with these adjustments of the registers S3, S31, S32, S33, S34, S35 and S38 involving creating a new register S3 or S3' by allocating memory space to said new register and, for the first version of the invention: by guiding the register S3 towards the numbers of the register S1 that are assigned thereto, by setting the registers S31 and S32 to '0' and S33 to the amount of numbers forming the key, by setting the register S35 to the 'false' Boolean value and registering the identifier of the appliance communicating with the server in S38; and, for the second version of the invention: by registering the identifier of the key of the register SF that is assigned thereto in the register S3', by setting the Boolean register S18' to true that indicates whether the key of S1' is used on a register S3', by placing the register S35 indicating whether the key has been copied onto the appliance to the 'false' Boolean value and by registering the identifier of the appliance communicating with the server in S38; and 2) for each register S3 or S3' created in the preceding step, creating registers S3 or S3' associated with the appliance containing the same information as the register S3 or S3' of the other appliance, but in which the registers S38 of the identifier of the other appliance include the identifier of the other appliance and in which, in the register S39, a copy is registered of the random numbers of the registers S1 or S1' to which the key refers;
iv. establishing, by the server, on the basis of the list of sets S3 or S3' modified in the preceding step, a set of keys associated with said appliance and marked as not present in its set A3, but present in the set S1 or in the set S3 (S1' or S3') of the other appliances;
v. associating keys with their identifiers, i.e. their position and size in the register A1 (A1') of the appliances, as well as the identifier of the appliance with which each of these keys is associated, and optionally consolidating this information into groups, with the information relating to each key all being found in each of these groups;
vi. compiling a message containing, for a group for which such a message has not yet been compiled, the elements determined in the preceding step into a message, the keys (and not their identifiers) being encrypted, then signing said message, the keys of the register S1 or S1' used for encrypting, as well as for signing, being marked as used and the message being registered in the register S15 of the server;
vii. sending the preceding message;
viii. upon receipt of an acknowledgement of receipt for the preceding message, deleting one of the messages that has not received an acknowledgement of receipt from its register S15, and the server updating its registers S35 or S36;

ix. sending other groups formed in step vi that are still to be sent if some are still to be sent, by repeating steps vii and viii of the procedure.

This procedure can be limited to the keys belonging to a limited sub-group of other appliances, for example, to the last two other appliances the appliance communicated with using one-time keys, or to the appliances pending an acknowledgement of receipt, or even to the appliances without any associated key, either since one of the two appliances has been recently introduced into the system of appliances that can communicate with the server, or since secure communications have already occurred between the two appliances; it is possible, for example, to have 8 keys in the first case, representing 2 keys that will remain on the appliance, plus 2 keys that can be transferred to the other appliance by a message containing 4 keys, or even 28 keys if the appliances have already communicated, representing 12 keys that will remain on the appliance, plus 12 keys that can be transferred to the other appliance by a message containing 4 keys, or even more keys if the two appliances often communicate.

Procedure for Reversing the Role of the Keys

With the keys being assigned either to encrypt or to decrypt, situations can occur whereby keys shared between two devices, appliances or servers A and B, are all assigned to encrypt on A and to decrypt on B, whereas data must be encrypted on B in order to be sent to A.

In this case, the role of the keys can be reversed and thus hereafter reference will be equally made to the role reversal of keys and to key reversal.

Keys can be reversed in accordance with the following procedure:

1. the device A verifies that its register S15bis, A15bis or A40bis, containing the last message sent to the device B that has not received an acknowledgement of receipt, is empty;
2. A forms a list of keys, marked for encryption and present in the register of keys of the other appliance dedicated to communications between appliances, that it wishes to be marked for decryption, identifies keys required to sign the message that it wishes to send, and, if the register A42 or S42 indicating that the messages of requests for keys intended for the other appliance must be signed, identifies an additional number of keys allowing such a signature, so as not to reverse their role. It includes, in the list of keys that it wishes to change the role of, keys that will be useful when B sends an acknowledgement of receipt to the message that is being prepared; and, finally, A cancels the procedure if it does not have keys for which the role can be reversed;
3. the device A makes up the message formed from the preceding list, signs said message, places it in its register of key reversal messages that have been sent and that have not received an acknowledgement of receipt S15bis, A15bis, S15bis or A40bis and reverses, in its own registers, the direction of use of the sent keys and marks as used the key that was used for the signature;
4. A sends the message;
5. the device A receives an acknowledgement of receipt and deletes the message placed in the register S15bis, A15bis, S15bis or A40bis in step 3.

Preferably, the device B, upon receipt of the message sent in step 4:

a. verifies that an acknowledgement of receipt for the received message has not already been prepared, and sends said acknowledgement of receipt if this is the case, then thus terminates the procedure;
b. verifies the signature of the message and rejects it if it is not valid, with the signature being able to use keys present on its register S1 or S1' that also contain keys dedicated to communications between the server and the appliance;
c. marks as encryption keys the keys corresponding to the sent references, prepares an acknowledgement of receipt, uses one of them to compile the signature of the acknowledgement of receipt of the received message, thus marking said key as used, then registers the acknowledgement of receipt in the register S16bis, A16bis, S16bis or A41bis of the acknowledgements of receipt of the key reversal or key transfer messages. The modifications of the registers on B are preferably all validated at the same time, at the end of this step;
d. the device B sends the message prepared in the preceding step.

Key Transfer Procedure

In some cases, a key can be present on a register of a device, appliance or server A, as being assigned to data encryption with an appliance B, without the appliance B being notified as such; with the key nevertheless being present on B although not assigned to communicate with A, the appliance A can send a message to the appliance B in order to instruct it to mark said keys as dedicated to communicate with A. The following procedure preferably will be used to this end:

1. A receives, if necessary, the acknowledgement of receipt of the preceding message dedicated to sending keys that have not received an acknowledgement of receipt and stops the present procedure if the acknowledgement of receipt is not received;
2. if A is connected to the server, it can perform the procedure for synchronizing keys between a server and an appliance, optionally by restricting this procedure to the keys dedicated to communications with B or to the keys dedicated to communications with the appliances for which A has received n messages and for which A does not have enough keys in order to send an acknowledgement of receipt;
3. A extracts, from its keys marked for communicating with B but not present on B, keys required for the signed transmission of the message being prepared by the present procedure and, if the register A42 indicating that the messages for requests of keys intended for the other appliance must be signed, identifies an additional number of keys allowing such signing in order for them not to be sent;
4. A optionally changes the role of some of its marked keys for communicating with B but that are not present on B, by marking them reserved for encryption on A;
5. A creates a list of keys marked for encryption by B and another list of keys marked for encryption by A, with the keys of these lists being marked for communicating with B but not present thereon;
6. A signs the message made up of the two lists prepared above using the keys identified in step 2, and registers the signed message in the register assigned to the key transfer messages that have not received an acknowledgement of receipt;

7. A sends the message;
8. A receives an acknowledgement of receipt and deletes the message from the register assigned to key transfer messages that have not received an acknowledgement of receipt.

The entries in the registers that are made in steps 4 to 6 are preferably all rendered definitive at the end of step 6.

Preferably, upon receipt of the message sent by A in step 7:
- a. B resends the acknowledgement of receipt located in the register of acknowledgements of receipt of messages dedicated to sending keys, if the received message is the one for which the acknowledgement of receipt has already been placed in the register of acknowledgements of receipt;
- b. B verifies the signature of the message, with the keys that were used for said signature being able to be found on the registers of the keys used for the exchanges between the server and the appliance, and rejects the message if the signature is not valid;
- c. B deletes the register of the acknowledgements of receipt of messages dedicated to sending keys;
- d. B registers the keys used for signing in their register of keys used for communications with the other appliance, by marking these keys as being used;
- e. B registers the keys received in the message in its register of keys used for communications with the other appliance, by marking these keys as being unused and also registers the role of said received keys in accordance with the received message;
- f. B prepares an acknowledgement of receipt of the message, optionally the marked received keys assigned to encrypt, and registers said acknowledgement of receipt in the register of acknowledgements of receipt assigned to the key reception messages;
- g. B sends the acknowledgement of receipt.

The entries in the registers that are made in steps b to d are preferably all rendered definitive at the end of step d.

Procedure for Placing New One-Time Keys on an Appliance from a Server

A further aim of the invention, according to another one of its aspects, is a method for placing new one-time keys on an appliance from a server, the method comprising:
1. preferably, connecting the appliance to the server in a secure environment, and physically retaining the appliance in said environment until the procedure is terminated, then computing the number of keys remaining in the register of keys S1 or S1' in order to know if there are enough remaining to send at least 2 signed messages, and, finally, sending a secure message to the appliance to indicate that the appliance is secure;
2. if enough keys remain on the register S1 or S1' that can be used to communicate with the appliance so that, following the possible synchronization, the appliance and the server can exchange a signed message, preferably performing the synchronization procedure between the appliance and the server by omitting to encrypt the keys, then verifying that the preceding message for sending or reversing the role of keys sent to the appliance has occurred upon receipt of an acknowledgement of receipt, by verifying that the register S15bis of the server containing the last message of keys sent to the appliance has already been deleted; otherwise resending the last message and waiting for an acknowledgement of receipt, then restarting the procedure from step 1);
3. preferably, the appliance deleting keys that have already been used from its sets A1' and A3' or A1 and A3 containing the keys used to communicate with the server or with the appliances, then freeing up, on the appliance and on the server, memory space occupied by the deleted keys, and notifying the server of the memory space available on the appliance using a signed message;
4. using the set of registers located on the server, the server computing the number of new one-time keys that can be placed on the appliance in its list A1' or A1 of keys dedicated for communicating with the server, the number of keys to be placed on the appliance being deduced from the register S4, from the memory space available on the appliance received in a signed message, as well as from the space that needs to be kept available for the creation of new registers A3 or A3' dedicated to securing communications between appliances;
5. generating, preferably by a random number generator, new keys;
6. creating a plain, but preferably signed, message preferably placed in the register S15bis containing these keys;
7. sending the message prepared in the preceding step to the appliance;
8. the appliance receiving the message and copying the keys registered on said message onto the register A1' or A1 containing the keys used to communicate with the server, as well as possible updating of the registers A11, A12, A13 and A14, then registering an acknowledgement of receipt in the register A16bis of the appliance, and finally sending said acknowledgement of receipt to the server;
9. receiving a preferably signed acknowledgement of receipt sent by the appliance, and this can be with a key sent in step 7, and the appliance recording keys registered on the message in the register S1 or in the set S1' located on the server used to communicate between the server and the appliances, as well as optionally updating the registers S11, S12, S13 and S14 and deleting the register S15bis from the server;
10. preferably, repeating the synchronization procedure between the appliance and the server whilst omitting to encrypt the keys;
11. terminating the connection in a secure environment, then authorizing the appliance to leave the secure environment.

The modifications of registers, including registering messages or acknowledgements of receipt in the registers A15bis, S15bis, A16 or S16bis of the appliance or of the server in which they are placed before they are sent, are preferably concomitant within each of the steps described above.

Steps 6 to 9 can be repeated if the keys created in step 5 are split into a plurality of groups, with each of these groups of keys being sent by separate messages.

A "connection in a secure environment" between the appliance and the server is understood to mean that either said appliance and said server communicate over a secure transmission channel, being, for example, directly connected in an environment protected against possible communication interceptions or even connected in a secure environment to an appliance communicating with the server by a connection which is secure, such as a quantum line. The protected environment can be, for example and by way of an illustration, a room protected by guards and surrounded with metal fences allowing said room to be isolated from radio waves.

Preferably, the method for placing new keys in a system according to the first version of the invention comprises, between steps 2 and 3:
  i. optionally, the server sending the appliance, preferably in a signed message, the list of appliances for which said appliance can delete the recordings on its register A3 or A3' of keys intended to secure communications between the appliance, with this list comprising the identifiers of the appliances for which the register S5 indicates that said appliances must no longer communicate with said appliance, or even with which an excessive number of keys is associated, i.e., for example greater than 40% of the optimal number of keys registered on the register S4;
  ii. optionally, the device deleting information relating to the appliances indicated in step i from its registers A3 or A3'.

Procedure for Sending an Acknowledgement of Receipt of a Received Message for which No Acknowledgement of Receipt has been Sent The following steps preferably are to be implemented by a first device that has received a first message from a second device, for which first message an unsigned, and therefore unsent, acknowledgement of receipt has been prepared:
  1. if the first device does not have enough keys for sending an acknowledgement of receipt of the first message, the first device requests role reversal or for the keys to be transferred to the second device by a second message (signed if the register A42 or S42 associated with the second device indicates that such a request must be signed), and if the keys are received, the first device associates these with the communications with the second device, then optionally compiles an acknowledgement of receipt for the second received message transferring the keys. The procedure is stopped if no key is received;
  2. the first device prepares and sends the acknowledgement of receipt of the first message.

The second device with which the first device, appliance or server, communicates can, in particular during step 1, if keys are requested for one or more acknowledgements of receipt, verify the signature of the second received message, if the register S42bis or A42bis associated with the second device indicates that such a signature is necessary. Then, if the verification is positive, the second device responds to the request by sending a third signed acknowledgement of receipt message comprising a sufficient number of requested keys for the acknowledgement of receipt. If such a request has already been made and an acknowledgement of receipt has already been sent in the form of a third message, the second device resends said third message. If the request is not signed, but the register S42bis or A42bis allows such a request to be accepted, without having compiled a third message, the second device compiles a fourth message for reversing the role of keys or for transferring keys including keys allowing the first device to sign the acknowledgement of receipt prepared for the first message, then places the fourth message in the register S15bis, A15bis or A40bis of messages to be sent comprising the keys for an acknowledgement of receipt, and finally sends said fourth message.

Procedure for Resending a Message for which No Acknowledgement of Receipt has been Received The following steps preferably are to be implemented by a first device having sent a message to a second device, for which message no acknowledgement of receipt has been received:
  1. if the message placed in the register S15bis or A40bis previously sent by the first device comprising the keys required for its acknowledgement of receipt has not yet received an acknowledgement of receipt, the first device resends said message, then waits for the time that it will take for the acknowledgement of receipt to be received when the second device can normally communicate with the first device; otherwise it transitions to step 3;
  2. if there is no response to the message of the preceding step, the procedure is cancelled since this message comprising the keys required for its acknowledgement of receipt should have resulted in an acknowledgement of receipt;
  3. if another message, placed in the register S15 or A40 of messages previously sent by the first device, has not yet received an acknowledgement of receipt, the first device resends said message and waits for the usual time that is taken to resend an acknowledgement of receipt then, upon receipt of the acknowledgement of receipt, the first device deletes messages from the register that have not received an acknowledgement of receipt of the message corresponding to the received acknowledgement of receipt, then the procedure is finished;
  4. if the preceding message placed in the register S15 or A40 of sent messages, and sent in the preceding step by the first device, has not yet received an acknowledgement of receipt, if the first device has enough keys, the first device sends a key transfer or role reversal message providing the second device with enough keys to send an acknowledgement of receipt to the message located in the register S15 or A40, as well as to said key transfer or role reversal message; then the first device waits for the time that it will take for the acknowledgement of receipt to be received when the second device can normally communicate with the first device. The sent keys actually must allow the acknowledgement of receipt to be sent;
  5. upon receipt of the acknowledgements of receipt that are expected after messages are sent in the preceding step, the first device removes the messages from the list of sent messages pending an acknowledgement of receipt;
  6. if the acknowledgement of receipt of the preceding message still has not been received, the first device cancels the procedure.

The second device with which the first device, appliance or server, communicates particularly can:
  a) after step 1, receive the message, and if this has already led to the preparation of an acknowledgement of receipt, resend said acknowledgement of receipt, otherwise, associate the keys optionally included in the received message with the communications with the first device, and prepare and send an acknowledgement of receipt;
  b) between steps 3 and 4, receive the message, and if this has already led to the preparation of an acknowledgement of receipt, resend said acknowledgement of receipt, otherwise, associate the keys included in the received messages with the communications with the first device and prepare an acknowledgement of receipt for said message, as well as for the other message located in the register containing an unsigned acknowledgement of receipt message, then send the acknowledgements of receipt. Then, if a message is received that originates from the same device, respond thereto by sending an acknowledgement of receipt.

Procedure for Sending a Message Signed by One Device to Another Device

1. Before creating a new message to be sent to a second device, the first device preferably ensures that all the acknowledgements of receipt of messages originating from the second device have been sent and that any message sent to the second device has led to the reception of an acknowledgement of receipt. The first device can also block the reception and send any message originating from or intended for the second device, other than that required for the procedure for sending the message, during the preparation of said message and until the sending procedure is cancelled or completed. The procedure for sending the message then preferably comprises the following steps: the first device computes the number of keys required to send the message, computes the number of keys required to send the acknowledgement of receipt, and consults the register S42 or A42 indicating that the messages requesting keys intended for the second device must be signed, since the first device then preferably must keep enough keys available for encryption intended for the second device in order to be able to claim other keys therefrom;
2. if the first device does not have enough keys for sending the message, it requests that the second device transfers or reverses the role of the lacking keys, with the request being made by sending a signed message if the register S42 or A42 associated with the second device indicates that such a request must be signed, otherwise it transitions to step 5;
3. if the first device does not receive the number of lacking keys, it cancels sending the message;
4. if the first device receives the number of lacking keys, it adjusts the register A3, A'3, A1, A'1, S1 or S'1 provided to this end, compiles an acknowledgement of receipt of the message that transferred the keys, then marks the keys used to compile said message as being used, with these actions being concomitant. Then, it sends said acknowledgement of receipt message; otherwise it cancels the sending procedure. The adjustments of the registers A3, A'3, A1, A'1, S1 or S'1 involve modifying the registers A32, A12 or S12 separating the keys associated with encryption from the keys associated with decryption for the first version of the system, or even reverses the flags A12' or S12' indicating the role of the keys for the second version of the system, if the keys are received by reversing the role of the key, or even by creating registers A3 or A3' if the keys are transferred, with the received keys being registered therein as keys used for encrypting with the other appliance. In the registers A32, A12 or S12, the keys are assigned to encrypt up to a certain location, then they are assigned to decrypt, with the location being modifiable, so as to convert encryption keys into decryption keys, or vice versa;
5. the first device optionally encrypts the parts to be encrypted, creates and signs the message to be sent, marks as used the keys used for this creation and this signing and registers the created and signed message in the register of sent messages that have not received an acknowledgement of receipt. Preferably, the registrations of the modifications of the registers of this step are concomitant;
6. the first device sends the message registered in the register in the preceding step;
7. optionally, the first device gathers the acknowledgement of receipt and deletes the message from the register where it was placed in step 5.

The second device with which the first device, appliance or server, communicates particularly can:

a) after step 2, verify the signature of the received message if the register S42bis or A42bis associated with the first appliance indicates that such a signature is necessary, then, if the verification is positive, respond by sending a signed message for reversing the role of the keys or for transferring the requested number of keys (increased by the amount needed to send an acknowledgement of receipt to said message), if they are available, after having optionally reversed the role of some keys so that they are assigned to decrypt, the message also being an acknowledgement of receipt if the received request is signed;

b) after step 4: upon receipt of the acknowledgement of receipt, delete messages from the register that are pending an acknowledgement of receipt, the message corresponding to the received acknowledgement of receipt;

c) after step 6, upon receipt of the message, verify if this has not already resulted in a response or an acknowledgement of receipt by comparing it to the message registered in the register associated with the last sent acknowledgement of receipt. If this is the case, resend the response or the acknowledgement of receipt located in the register provided to this end;

d) if step c) has determined that the message was new, verify the possible signature of the message and reject it if it is not valid;

e) integrate any possible received keys, copy the message in the register of the last received message, decrypt said message, and empty the acknowledgement of receipt register;

f) register the received message, or even its summary, in the register that is attached to the register without an acknowledgement of receipt and prepare the acknowledgement of receipt; otherwise, ignore the message;

g) then, if there are enough keys to sign the acknowledgement of receipt, sign said acknowledgement of receipt in its register A41, A41bis, S15, A15, S15bis or A15bis, then send it to the first device initiating communication.

Method for Encrypted Communication Between Two Devices for Sending a Long Message The messages exchanged between devices are sometimes long, i.e. likely to experience an interruption in the communication exchanging said message. The long message then needs to be cut into several small messages, with the interruption of the transmission of a small message not requiring having to re-transmit the small messages that have already been transmitted correctly. Therefore, a further aim of the invention, according to another aspect thereof, is a method for encrypted communication between a first device and a second device for sending a long message M from the first device to the second device, the method comprising:

a) preferably, the first appliance dividing the message M into more small messages, each having a sequence number and, if possible, each being of a size that corresponds to a size of a one-time key available for communicating with the other appliance;

b) preferably, the first appliance generating, which can be incremental but preferably is random, an identifier of the message M, the identifier of the message M, the sequence number of each small message and the total number of small messages being concatenated with each small message;

c) applying, for each small message, the "Procedure for sending a message signed by an appliance or server to another appliance or server", with the signing of the small message in step 15 being omitted if the message only has to be encrypted and not encrypted and signed;

d) resuming the sending of the small messages not sent upon receipt of the acknowledgement of receipt of the preceding small message, if the procedure must be interrupted, for example, due to a lack of keys or by disconnecting the link between the two appliances.

The identifier of the message M can be a series of alphanumeric characters and/or signs that can be converted into a digital word by means of an ASCII code or other.

The identifier of the message M can be a number generated in a random or pseudo-random manner.

The identifier of the message M is preferably generated by the first appliance. As an alternative embodiment, the identifier of the message M is generated by another confidence appliance.

The identifier of the message M, the sequence number of each small message and the total number of small messages are preferably sent unencrypted, with each small message then preferably being signed and the signature also bearing the identifier of the message M, the sequence number of each small message and the total number of small messages.

Upon Receipt of all the Sent Messages, the Second Appliance Reconstructs the Message M.

Examples of Use

The invention can be used, for example, to securely transfer, by a physical connection or by a wireless connection, an electronic key identifier to a secure electronic door lock or door opening command, with this lock being able to open upon receipt of an approved identifier.

The invention also can be used to transfer certain information stored on a card equipped with a small screen and a tool for selecting documents stored on the card. A document selected by the selection tool can be securely transmitted to a second card via an NFC connection, when approaching the first card from the second card, optionally after having approved such use by entering a code or one or more biometric means such as, for example, verifying a fingerprint.

The invention also can be used to securely transfer text messages from one telephone to another via the digital telephone network. The invention is implemented after having pressed the message transfer button for sending the message to an intermediate server or directly to another telephone, if said telephone is connected to a data network when the message is sent. The invention also can be used to register a telephone on a network, with the secure communication allowing the network and the telephone to exchange their identifiers.

When implemented in a system comprising a temperature or pressure recording sensor, or in a system comprising an electricity, gas, water or heat meter, the invention can be used to securely read such a meter, which communicates via a wireless network, such as a Wi-Fi or 3G network with a remote data centre, or which communicates via NFC or Bluetooth, with an electronic appliance for gathering measured data. Meters or specially designed sensors communicating according to a method of the invention can be used in medical appliances implanted in bodies, for example, to monitor medical conditions, batteries or heart implants.

When implemented in a system comprising vehicles, the invention can be used to establish secure data links between vehicles that are close to each other. The one-time keys can be used to encrypt the hash of the transmitted data, thus guaranteeing the authenticity of these data. The data can be transferred via Bluetooth, and a secure communication channel can be established for all the vehicles within Bluetooth range and sharing one-time keys.

The invention also can be used when sending emails, to encrypt them, or even for their signatures, in particular if the transmitter and receiver appliances of said emails are mobile or even if they have a module or software allowing the encryption and verification work as described according to the invention to be performed. In general, the invention can be used each time a secure data communication link is required between devices, with the security of the link involving keeping the transmitted data secret and/or ensuring that said data has not been modified during the transmission, with the communication being wired, wireless or a combination of the two.

A further aim of the invention, according to another one of its aspects, is a computer program product comprising instructions that can be read by a processor of an appliance for implementing the method according to the invention.

BRIEF DESCRIPTION OF THE DRAWINGS

The invention can be better understood from reading the following detailed description of non-limiting embodiments thereof, and with reference to the accompanying drawings, in which:

FIG. 2 is a table indicating which procedure of the invention uses which other procedure;

FIG. 3 schematically illustrates the register A1, as well as its associated registers according to the first version of the invention;

FIG. 4 represents an example of the use of the invention, with the appliances of the system being either of the credit card type, or of the dual-reader type, in particular of the international dual-reader type;

FIG. 5b represents the steps following those described in FIG. 5a;

FIG. 6b illustrates the steps following those described in FIG. 6a.

DETAILED DESCRIPTION

FIG. 1: The Various Links Between Appliances and Servers

FIGS. 1a to 1f illustrate the various links between appliances and servers.

A is an appliance and S is the server. For example, the appliance A is a personal computer or a smart phone or a smart card.

The appliance A and the server S each can be equipped with a processor for executing the steps of a method according to the invention, and with a memory for saving the data required for this execution and other memories for containing the registers described in the invention, with these memories preferably being persistent, such as hard disks or a flash memory.

Figure 1A:
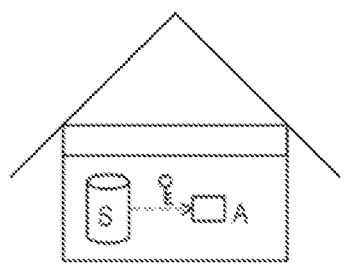
FIGS. 1a, 1b, 1c, 1d, 1e, and 1f schematically illustrate the various links between appliances and servers.

In FIG. 1a, keys are added to the appliance by the server in a secure room close to the server.

Figure 1B:

In FIG. 1b, keys are added to the appliance by the server in a secure room remote from the server. The computer link L is secure, being a quantum link, for example.

Figure 1C:
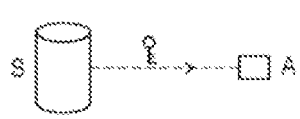

In FIG. 1c, keys present on the appliance A are assigned by the server S for securing communications with other appliances.

Figure 1D:
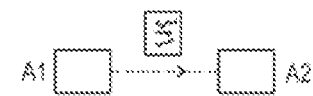

In FIG. 1d, two appliances A1 and A2 exchange secure data.

Figure 1E:
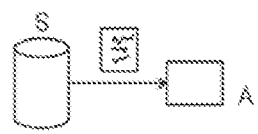

In FIG. 1e, the server S exchanges secure messages with an appliance A.

Figure 1F:
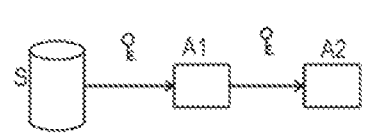
Figure 5A:
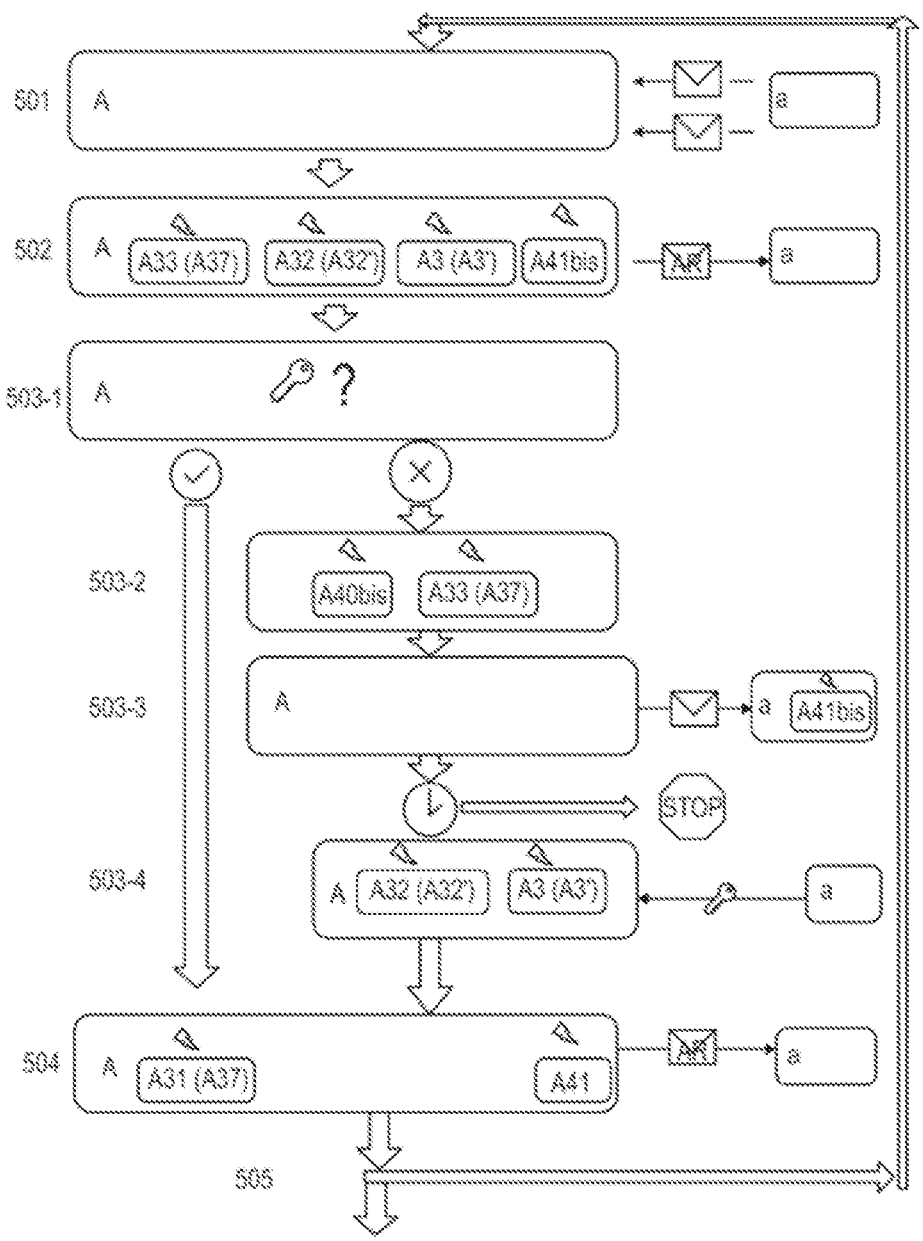
FIG. 5a schematically illustrates the first steps of an example of a procedure for transferring a signed message between two appliances.
Figure 5B:
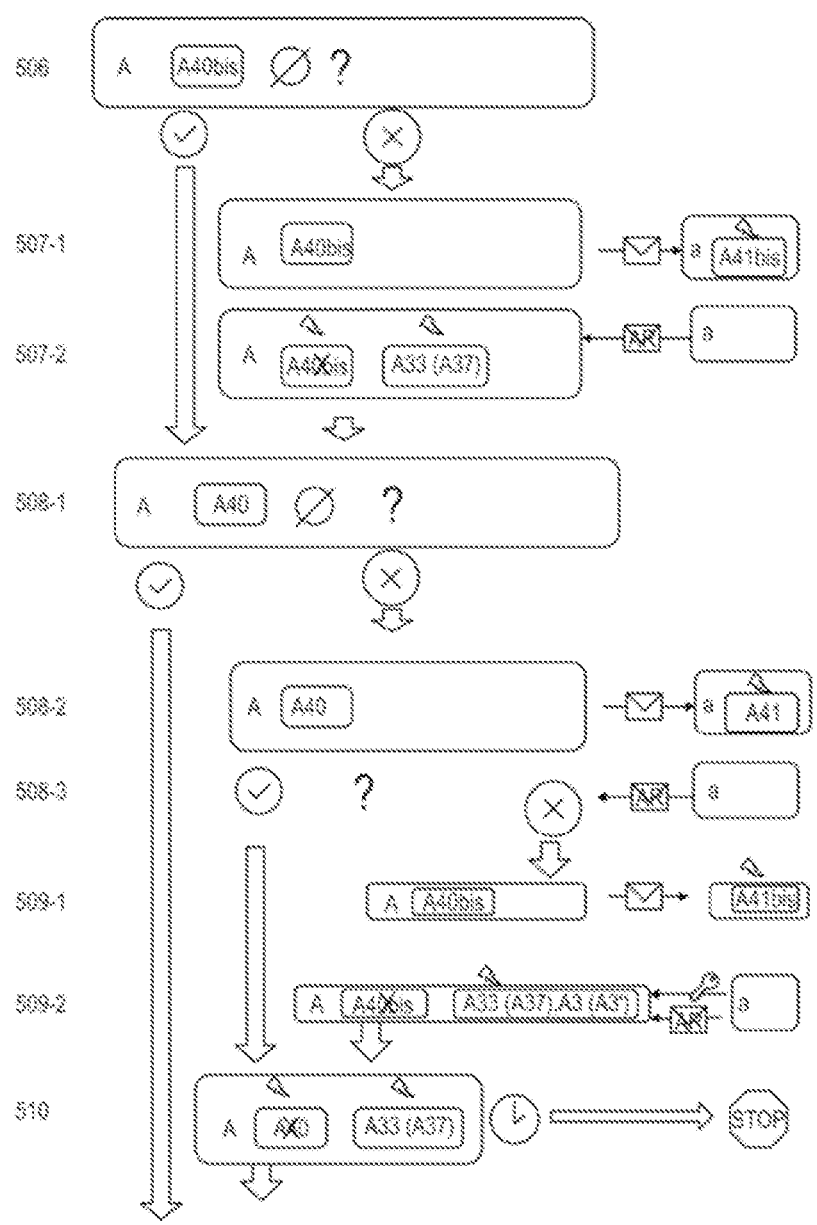
Figure 5C:
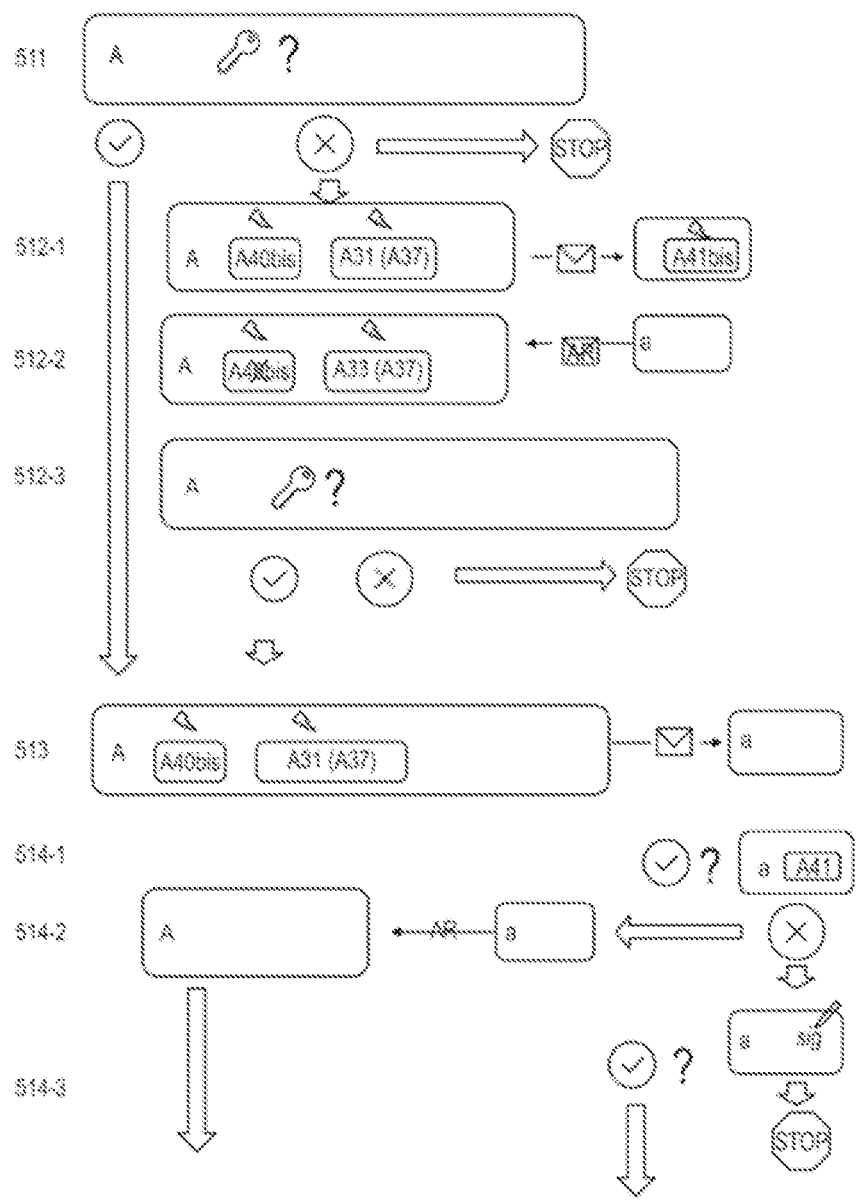
FIG. 5c represents the steps following those described in FIG. 5b.
Figure 5D:
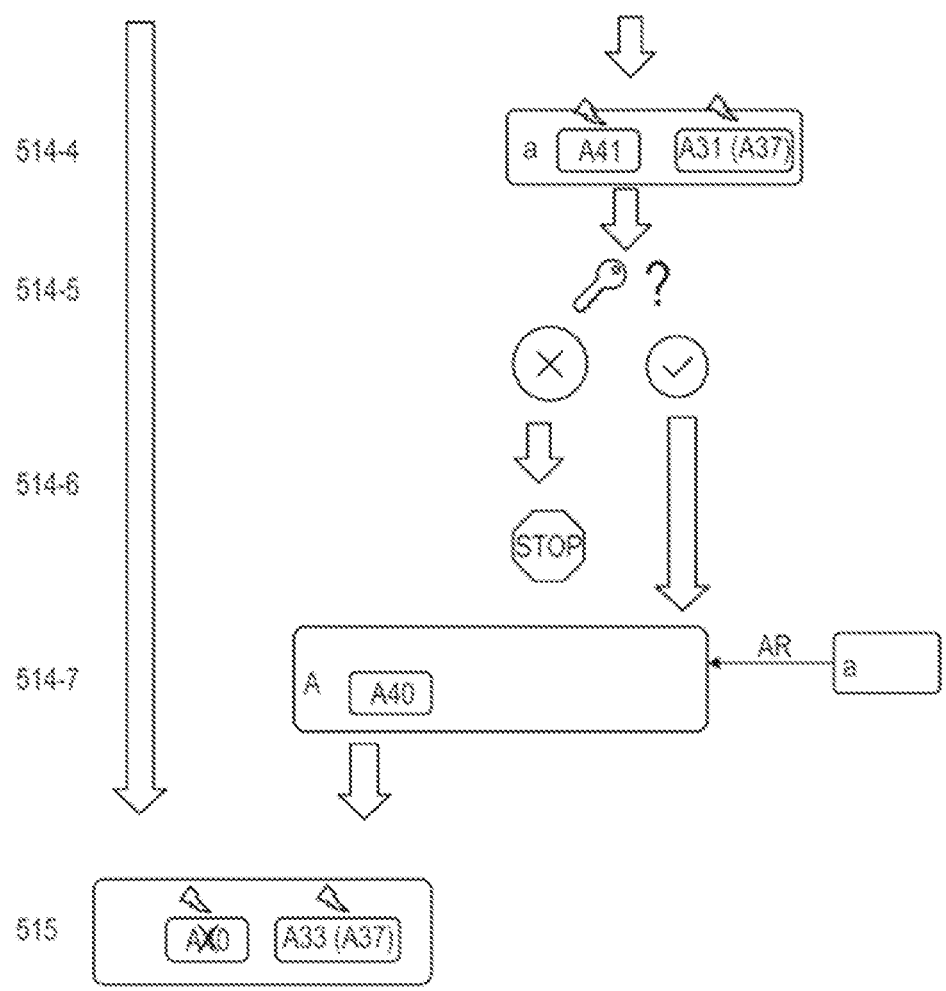
FIG. 5d illustrates the steps following those described in FIG. 5c.

FIG. 1f illustrates the communication of keys using a first appliance A1 to a second appliance A2 so that said second appliance can communicate with a third appliance.

FIG. 2: Table of Procedures

FIG. 2 is a table indicating which procedure of the invention uses which other procedure. For each procedure written on a line of the table, the procedures are identified that are written on the columns that they may use directly (by 'TRUE') or indirectly (by 1). The last column indicates which types of devices the procedure exchanges data with.

FIG. 3: The Register A1

FIG. 3 schematically illustrates the registers A1, as well as its associated registers, according to the first version of the invention.

301 represents the numbers that are either already used for encryption or are being used by the register A3.

302 represents the numbers used as keys for encryption that have not already been used.

303 represents the numbers used as keys for decryption that have not already been used.

304 represents the numbers used as keys for decryption that have already been used.

FIG. 4: National Dual-Readers and International Dual-Readers

FIG. 4 represents an example of the use of the invention, with the appliances of the system either being of the credit card type, or of the national dual-reader type, or of the international dual-reader type. The national reader can communicate with all the cards belonging to the same national group, whereas the international reader can communicate with all the cards of the system. The national readers can, for example, be distributed to all the inhabitants of the same country, and the international readers can be distributed to all the merchants of several countries.

401: two cards from the same country communicate using a national dual-reader II.

402: two cards, optionally from different countries, communicate together via an international dual-reader III.

FIG. 5: Transfer of Messages According to the First Version of the Invention

FIG. 5 is made up of FIGS. 5a to 5d, schematically illustrating an example of the transfer of a signed message between two appliances A. The names of the modified registers are indicated between brackets for the registers of the second version, when these are different from the registers in the first version.

In step 501, the first appliance A receives a message optionally sent by the second appliance 'a', as well as, optionally, a message also transferring the keys required for its acknowledgement of receipt.

In step 502, the first appliance A registers as used the identifiers of keys optionally used in the received message by modifying the registers A33 (A37) associated with the used keys, then optionally registers as reversed the keys sent in the key transfer message by modifying the register A32 (A32') associated with said reversed keys or by adding a new register A3 (A3') for the received key, and compiles, then signs an acknowledgement of receipt on the register A41bis of the possible key transfer message before sending said message.

In step 503-1, A verifies that there are enough keys for sending an acknowledgement of receipt (two keys are required to send a signed acknowledgement of receipt, but the appliance must also keep an additional 4 keys in order to be able to request more keys from the other appliance if such a request has to be signed) and proceeds to step 504 or, otherwise, in step 503-2, resends the message from the register A40bis if it is not empty (then receives the acknowledgement of receipt and deletes said register A40bis), then prepares, on the register A40bis, a key transfer request message, signs said message (and marks the keys used for the signature as used by modifying their register A31 (A37)), if the register A42 associated with the other device indicates that a key request must be signed, and finally sends the message in step 503-3, then receives and integrates the keys in step 503-4 by modifying the registers A3 or A32, and proceeds to step 504 or even does not receive the keys and stops the procedure.

In step 504, an acknowledgement of receipt is prepared for the first message received in step 501, with the preparation of this acknowledgement of receipt modifying the registers A31 (A37) and the acknowledgement of receipt being registered in the register A41. The first appliance A confirms the modifications of its registers, then sends the acknowledgement of receipt messages.

In step 505, steps 501 to 504 are resumed until no more messages are received from the other appliance.

In step 506, A verifies that the last message sent from its register A40bis comprising the keys required to send an acknowledgement of receipt has been received by verifying that the register A40bis is not empty. If said register A40bis is empty, the procedure proceeds to step 508.

In step 507-1, the first appliance A sends the second appliance a the last message placed on its register A40bis comprising the keys required to send an acknowledgement of receipt; the second appliance a receives the message and responds by preparing and sending an acknowledgement of receipt in step 507-2, whilst marking as used the keys used for said acknowledgement of receipt. Then, the first appliance A receives the acknowledgement of receipt and deletes its register A40bis of sent messages, whilst marking as used the key used in the acknowledgement of receipt;

or even stops the procedure if it does not receive the acknowledgement of receipt.

In step 508-1, the first appliance A verifies if its register A40 is empty and, if this is the case, it transitions to step 512; otherwise, it sends the last message placed in its register A40 for sending a message in step 508-2.

In step 508-3, the second appliance responds by sending an acknowledgement of receipt and the first appliance transitions to step 510 or even does not respond and the first appliance transitions to step 509.

In step 509-1, if its register A40 is not empty, the first appliance A prepares and places on its register A40bis a message to be sent that comprises enough keys for its own acknowledgement of receipt, and for an acknowledgement of receipt for the message of the register A40; then confirms the register modifications and sends said message; otherwise, it transitions to step 511.

In step 509-2, the first appliance A receives the acknowledgements of receipt, deletes from its registers A40 and A40bis the sent messages that have not yet received an acknowledgement of receipt and marks, in the register A33 (A37), that the key used for the signature has been used, then transitions to step 510, or even stops the procedure if it does not receive said acknowledgements of receipt.

In step 510, the first appliance A deletes from the registers A40 the sent messages that have not yet received an acknowledgement of receipt and marks the register A33 (A37) containing the keys used to sign the received message.

In step 511, the appliance A computes the number of keys required to send the message, computes the number of keys required to send the acknowledgement of receipt, and consults the register A42 indicating that the messages for requests for keys intended for the other appliance must be signed, since the appliance then must keep enough keys available for encryption intended for the appliance.

In step 512-1, if the first device A does not have enough keys to send the message, it requests that the second device 'a' transfers a key thereto or requests a role reversal for the lacking keys, with the request being made by sending a signed message if the register S42 or A42 associated with the other appliance indicates that such a request must be signed. Otherwise, it transitions to step 516.

In step 512-2, the appliance A receives the lacking keys and registers the received keys in its registers A3 and sends an acknowledgement of receipt.

In step 512-3, the appliance A stops the procedure if it has not received enough keys.

In step 513, the appliance A creates and signs the message to be sent, marks as used the keys used for this creation and this signing and registers the created and signed message in the register A40 of sent messages that have not received an acknowledgement of receipt. The registrations and modifications of the registers of this step are concomitant; then A sends the message registered in the register A40.

Upon receipt of the message, the second appliance 'a' verifies, in step 514-1, if the received message has not already led to a response or an acknowledgement of receipt by comparing it to the message registered in the register associated with the last sent acknowledgement of receipt. If this is the case, it resends the response or the acknowledgement of receipt located in the register A41 provided to this end in step 514-2 and the process proceeds to step 515.

If, in step 514-1, the second appliance 'a' has determined that the message was new, it verifies the possible signature of the message in step 514-3 and rejects the message if the signature is not valid, otherwise the second appliance 'a' integrates the possible keys received in its register A3, prepares an acknowledgement of receipt if there are enough keys to do so, otherwise it prepares an acknowledgement of receipt without a key and copies said acknowledgement of receipt into the register A41 provided to this end in step 514-4, then it determines, in step 514-5, whether or not it will sign the acknowledgement of receipt and stops the procedure in step 514-6 if it has not signed said acknowledgement of receipt, otherwise it sends the acknowledgement of receipt in step 514-7.

In step 515, A gathers the acknowledgement of receipt and deletes the message from the register A40 where it was placed in step 518.

Figure 6A:
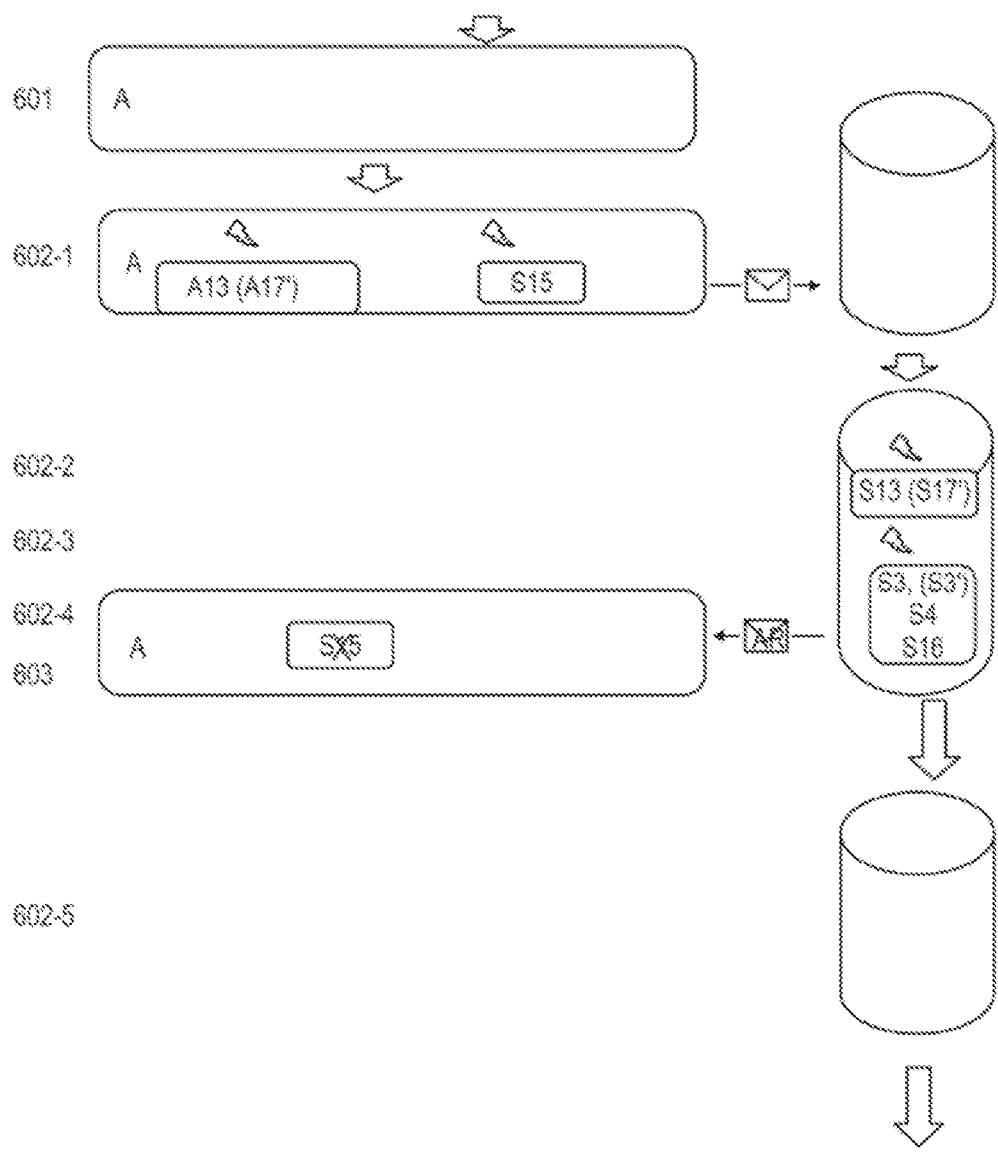
FIG. 6a represents the first steps of allocating and of synchronizing one-time keys for communicating between appliances.
Figure 6B:
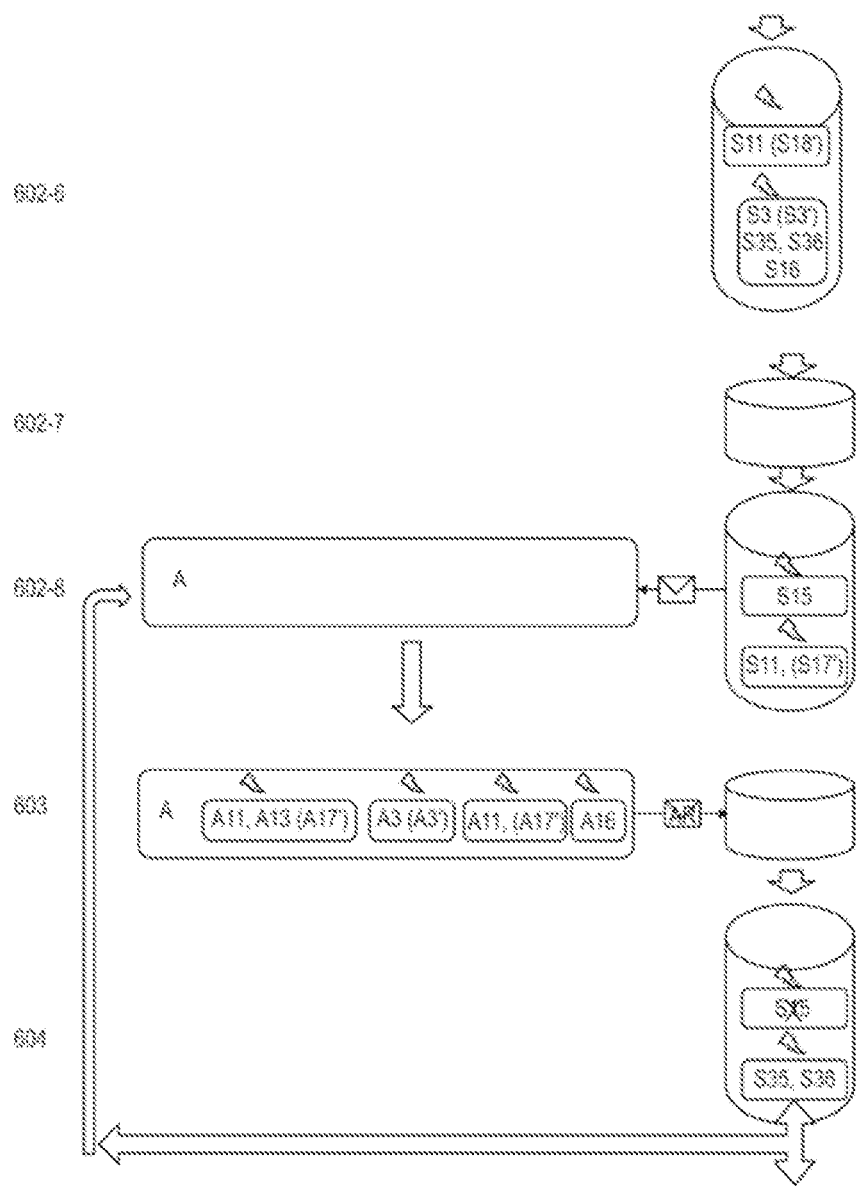

FIG. 6: Allocation and Synchronization of One-Time Keys for Communicating Between Appliances FIG. 6 is made up of FIGS. 6*a* and 6*b*, representing an example of allocation by the server of keys intended to secure communication between appliances, followed by the communication of these keys to said appliances.

The appliance A verifies having received the acknowledgements of receipt of the messages sent in the past to the server, then establishes, in step 601, from its set A3 of keys intended for security between appliances, a set of one-time key identifiers, for which the 'server flag' A35 is activated.

Then, the appliance A registers, in its register S15 of messages to be sent to the server, in step 602-1, a signed message containing identifiers of the set established in the preceding step, as well as the information A31, A32, A33, A34 (A37, A32') relating to the registers A3, the server flag of which is activated, the signature of the message requiring modification of the register A13 (A17') of the used keys and sends the message to the server.

After the server receives key identifiers of the set established in step 602-1, in step 602-2 the signature of the message is verified and the keys used for said signature are marked as used, by modifying the register S13 (S17'), then updating, in step 602-3, by the server, its set S3 (S3') and its related registers, as well as S4, and an acknowledgement of receipt of the message is compiled in the register S16, and is then sent in step 602-4.

The acknowledgement of receipt message is received by the appliance in step 603, which deletes the message registered in its register S15.

The server, preferably using, among others, the set S4, and its set S3 (S3'), as well as the sets S3 (S3') and their related registers of the other appliances and taking into account the number of keys of S1 (S1') required on the server to sign the message being prepared and taking into account the fact that any key transmitted from a register S1 (S1') of another appliance will require the same size key in order to be encrypted, computes, in step 602-5, for each other appliance, an optimal number of one-time keys to be used by the appliance to communicate with each of the other appliances; this number can correspond, for example, to a certain multiple of the number of keys used in the last week, increased by the number of keys used in the last month if this number is higher and further increased by a constant.

The server uses this optimal number and computes, on the basis of the registers S31, S32, S33 and S34 (S37), for each other appliance, the number of one-time keys not used, in order to determine the number of additional keys to be associated with the appliance for communicating with each other appliance of the system.

In step 602-6, the server associates one-time keys with the appliance that are present on the sets S1 (S1') of the other appliances identified in the preceding step and with which said appliance must obtain new communication keys, with this association of keys by the server preferably involving:

- adjusting the registers S11 (S18') of the other appliances to take into account newly assigned keys, i.e., for the first version of the invention, registering, in the register S11 of each one of the other appliances for which one or more keys of the register S1 is used to secure the communications with the first appliance, the address of the next key of the register S1 not yet used and not already associated with another appliance, or even, for the second version of the system, marking 'TRUE' on the register S18', indicating whether the key of S1' is used by a register S3' for the keys of the registers S1' of the other appliances assigned to communicate with the first appliance;
- adding, to the register S3 (S3') of the appliance, the keys and their positions in the registers S1 (S1') of the other appliances and marking these new keys as not copied onto the appliance or the other appliance (registers S35 and S36); and
- adding, to the register S3 (S3') of the other appliances, the identifiers of said keys, whilst adjusting the registers S11 (S18') of the used keys.

In step 602-7 the server S establishes the list of keys not present in its set A3 (A3') but present in the register A1 or A3 (A1' or A3') of the other appliance, this list can be non-zero, particularly following associations of keys with the appliance of step 602-6 of this procedure and the server S associates the keys with their identifiers, as well as the identifier of the appliance to which each of these keys is associated; it adds the keys to this list that are present that are placed on the register S3 (S3') associated with the appliance and not yet copied onto the appliance that have been placed on this register S3 (S3') by this same procedure used by some of the other appliances of the system.

In a step 602-8, it compiles, on its register S15, a message consolidating keys associated with a certain number of other appliances 20, for example, from the list defined in the preceding step and not yet sent to the appliance, then signs and sends this message to the appliance.

When the appliance receives new keys originating from the server:

In step 603 the appliance verifies the signature of the received message and decrypts the keys therefrom, whilst marking as used the keys used for the signature and the encryption (register A13 (A17')). It registers the received keys in the register A3 (A3') of the appliance, with the register A36 assuming the value of the register S36, and modifies the registers A11 (A17') of the used keys originating from the appliance, then compiles, in step 606, for the server, an acknowledgement of receipt that it registers in its register A16, marks as used the keys used for signing said message; then, finally, sends the acknowledgement of receipt.

Upon receipt of the acknowledgement of receipt, after verifying its signature, the server deletes its register S15 and updates, in step 605, its registers S35 or S36 for copying onto the appliance or for copying onto the other appliance. It then resumes, in step 602-8, as long as all the keys from the list defined in step 602-7 have not yet all been sent.

The invention is not limited to the embodiments described above, or to the illustrated applications. The invention can be particularly used to secure financial transactions, or in any procedure allowing one-time keys to be given to appliances using communication devices.

| Table of contents | |
|---|---|
| The keys in the first version of the invention | 5 |
| The keys in the second version of the invention | 6 |
| Registers | 6 |
| Registers specific to the first version | 6 |
| Registers specific to the second version | 9 |
| Registers shared by the two versions | 10 |
| Summary table of the registers | 15 |
| Means for transmitting between devices | 17 |
| Groups of appliances | 17 |
| Mediator appliances | 17 |
| Groups per regions or groups of users | 18 |
| Groups per groups of users with use of mediators | 18 |
| Devices | 19 |
| Encryption | 19 |
| Signatures | 21 |
| Acknowledgement of receipt | 22 |
| The benefit of having acknowledgements of receipt for ordinary messages | 22 |
| Retention of sent messages until the acknowledgement of receipt is received | 23 |
| Retention of the last sent acknowledgement of receipt | 23 |
| Deletion of the last sent acknowledgement of receipt | 24 |
| Content of the acknowledgement of receipt message | 24 |
| Concomitance between the writing of the received message and the registration of its acknowledgement of receipt | 24 |
| Verification of the modification of the register of another device | 25 |
| In the event of an error detected in the encryption | 25 |
| The keys | 25 |

| Table of contents | |
|---|---|
| Role assigned to the keys | 26 |
| Location of the keys | 26 |
| Key transfer message | 27 |
| Request for keys | 27 |
| Marking the use of the keys | 28 |
| Non-parallel procedures | 28 |
| Concomitance | 29 |
| Procedures | 29 |
| Procedure for allocating and synchronizing one-time keys for communicating between appliances through an unsecure link | 29 |
| Procedure for reversing the role of the keys | 33 |
| Key transfer procedure | 35 |
| Procedure for placing new one-time keys on an appliance from a server | 37 |
| Procedure for sending an acknowledgement of receipt of a received message for which no acknowledgement of receipt has been sent | 39 |
| Procedure for resending a message for which no acknowledgement of receipt has been received | 40 |
| Procedure for sending a message signed by one device to another device | 42 |
| Method for encrypted communication between two devices for sending a long message | 44 |
| Examples of use | 46 |
| Brief description of the drawings | 47 |
| Detailed description | 48 |
| FIG. 1: the various links between appliances and servers | 48 |
| FIG. 2: table of procedures | 49 |
| FIG. 3: the register A1 | 49 |
| FIG. 5: transfer of messages according to the first version of the invention | 50 |
| FIG. 6: allocation and synchronization of one-time keys for communicating between appliances | 53 |

The invention claimed is:

1. A method for securing communication within a system having at least one server and at least first and second appliances able to communicate with the server and with each other, the method comprising the steps of:
after a one time encryption key is used during a communication between the first and second appliances, another key is sent to the second appliance encrypted by a one-time encryption key used to secure communication between the second appliance and the server, that is not used, but that is already present on the first of the two appliances, after the second appliance has connected to the server,
allowing a subsequent secure communication between the at least first and second appliances, and the server, a connection between the server and the at least first and second appliances taking place in an insecure environment.

2. The method according to claim 1, wherein the at least one server and the at least first and second appliances keep their last sent message of the same type in a memory until an acknowledgement of receipt has been received for the message.

3. The method according to claim 1, wherein the at least one server and the at least first and second appliances keep a register of acknowledgements of receipt sent following reception of a last message of the same type, so that they can resend the acknowledgement of receipt should they receive the same message again.

4. The method according to claim 3, wherein the at least one server and the at least first and second appliances also keep a register of messages corresponding to the retained acknowledgements of receipt, or alternatively another means of acknowledging the messages, such as their hash, so as to be able to verify whether the received message has already resulted in the preparation of an acknowledgement of receipt.

5. The method according to claim 1, wherein registers modified by a creation and a signing of a message, including the register containing a last sent message, and that have not received an acknowledgement, are modified at substantially the same time.

6. The method according to claim 1, wherein registers that are to be modified when a message is received, including the register containing a last sent acknowledgement of receipt message, are modified at substantially the same time.

7. A system for implementing a method for securing communication within a system having at least one server and at least a first appliance and a second appliance, the first and second appliances able to communicate with the server and with each other, the method including the steps of:
after a one time encryption key is used during a communication between the first and second appliances, another key is sent to the second appliance encrypted by a one-time encryption key used to secure communication between the second appliance and the server, that is not used, but that is already present on the first appliance, after the second appliance has connected to the server,
allowing a subsequent secure communication between the at least first and second appliances, and the server, a connection between the server and the at least first and second appliances taking place in an insecure environment,
wherein the system comprises:
a set of registers present on the server, said set of registers comprising:
a register S1 for each appliance, but located on the server, containing an ordered list of random numbers associated with the appliance, the ordered list of random numbers being able to be used as shared one-time keys for securing communication between the appliance and the server and one-time keys used to secure communications between the first and second appliances;

at least one register S3 for each appliance, but located on the server, containing, for that appliance, a reference of keys assigned to secure communication between the first and second appliances.

8. The system according to claim 7, wherein said set of registers comprising:
 a register S11 for each appliance, but located on the server, comprising the reference of a first key of the register S1 that has not yet been either used or assigned to communicate between appliances;
 a register S12 for each appliance, but located on the server, comprising the reference of the first key of the register S1 assigned to decrypt data originating from the appliance;
 a register S13 for each appliance, but located on the server;
 at least one register S31 for each appliance, but located on the server, associated with each register S3 comprising the reference of the first key of the register S3 that has not yet been used by the appliance;
 at least one register S32 for each appliance, but located on the server, associated with each register S3 comprising the reference of the first key of the register S3 assigned to decrypt data received from the other appliance if first keys of the register S3 were assigned to encrypt, or even assigned to encrypt if the first keys of the register S3 were assigned to decrypt;
 at least one register S33 for each appliance, but located on the server, associated with each register S3 comprising a reference of the last key of the register S3 located after the key indicated by the register S32 and that has not yet been used;
 a register A1, located on each appliance, containing an ordered list of random numbers that can be used as shared one-time keys for securing communication between the appliance and the server and one-time keys used to secure communications between the first and second appliances;
 at least one register A3, located on each appliance, containing one or more lists of references of keys assigned to secure communication between the appliance and the other appliance, the keys being extracted from the register A1 of the appliance or from the register A1 of the other appliance;
 a register A11, present on each appliance, comprising the reference of the first key of the register A1 that has not yet been either used or assigned to communicate between appliances;
 a register A12, present on each appliance, comprising the reference of the first key of the register A1, starting from the start of said register, assigned to encrypt data sent to the server, which key has not already been used;
 a register A13, present on each appliance, comprising the reference of the last key of the register A1, starting from the start of said register, assigned to encrypt data sent to the server, which key has not already been used;
 at least one register A31, present on each appliance, associated with each register A3 comprising the reference of the first key of the register A3, starting from the start of said register, which key has not yet been used;
 at least one register A32, present on each appliance, associated with each register A3 comprising the first key of the register A3, starting from the start of said register, assigned to decrypt data sent to the other appliance; and
 at least one register A33, present on each appliance, associated with each register A3 comprising the last key of the register A3, starting from the start of said register, assigned to decrypt data originating from the other appliance and that has not already been used, such last keys of the register A3, for decryption, being extracted from the end of the list.

9. The system according to claim 7, wherein a signature of a message that cannot be predicted being formed from a hash encrypted by a one-time key concatenated with an identifier of the key.

10. The system according to claim 7, wherein a signature of a message that can be predicted being formed from an encryption of a randomly generated number randomly and from an encryption of the hash of a combination of the message to be signed with the number randomly generated by the sender concatenated with identifiers of two keys used for the encryptions.

11. The system according to claim 7, wherein a signature of a message that can be predicted being formed from encryption of the hash of the message combined with a one-time key, concatenated with an identifier of the one-time key and with the identifier of the one-time key used to encrypt the hash.

12. The system according to claim 7, wherein having a set of keys arranged one after the other in a register, forming a list, each of the keys being referenced by its place in the list.

13. The system according to claim 12, wherein the keys being able to be added within the list.

14. The system according to claim 12, wherein the keys having been used at the start or the end of the list being deleted from the list.

15. The system according to claim 8, comprising: two registers S42 and S42bis for each appliance, but located on the server, associated with each other appliance, used as a flag for indicating whether or not a request for keys or for the role reversal of keys respectively intended for or originating from the other appliance must be signed; and two registers A42 and A42bis associated with each other appliance or with the server used as a flag for indicating whether or not a request for keys or for a role reversal of keys respectively intended for or originating from the other appliance must be signed.

16. A system for implementing a method for securing communication within a system having at least one server and at least two appliances able to communicate with the server and with each other, the method including the steps of:
 after a one time encryption key is used during a communication between the first and second appliances, another key is sent to the second appliance encrypted by a one-time encryption key used to secure communication between the second appliance and the server, that is not used, but that is already present on the first one of the appliances, after the second appliance has connected to the server,
 allowing a subsequent secure communication between the first and second appliances, and the server, a connection between the server and the first and second appliances taking place in an insecure environment,
 wherein the system comprises:
 a set of registers present on the server comprising:
 a set S1' for each appliance, but present on the server, of one-time keys used either to communicate between the server and the at least first and second appliances or to communicate between the at least first and second appliances, each key having an identifier S11' and a randomly generated number S10';

at least one set S3' for each appliance, but present on the server, of identifiers of one-time keys used to communicate between the first and second appliances, a copy of the key being able to be found on a register S39', and, if the system comprises a plurality of servers, the identifier of the server holding the register S1' from which the key is extracted.

17. The system according to claim 16, said set of registers comprising:
a set A1', present on each appliance, of one-time keys used to communicate between the server and the appliance or to communicate from the appliance with at least one other appliance, each key having an identifier A11' and a randomly generated number A10'; and
at least one set A3', present on each appliance, of identifiers of one-time keys used to communicate between the relevant appliance and another appliance, optionally accompanied by the key.

18. A method for sending a message signed by a first device to a second device, the first and the second device belonging to a system
according to claim 8, having:
two registers S42 and S42bis for each appliance, but located on the server, associated with each other appliance, used as a flag for indicating whether or not a request for keys or for the role reversal of keys respectively intended for or originating from the other appliance must be signed; and two registers A42 and A42bis associated with each other appliance or with the server used as a flag for indicating whether or not a request for keys or for a role reversal of keys respectively intended for or originating from the other appliance must be signed,
wherein said method comprises the steps of:
a. the first device computes the number of keys required to send the message, computes a number of keys required to send an acknowledgement of receipt, and consults the register S42 or A42 indicating that messages for requesting keys intended for the second device must be signed, since the first device then must keep enough keys available for encryption intended for the second device;
b. if the first device does not have enough keys for sending the message, it requests from the second device the transfer or the role reversal of lacking keys, the request being made by sending a signed message if the register S42 or A42 associated with the second device indicates that such a request must be signed, otherwise the method transitions to step e;
c. if the first device does not receive a number of lacking keys, it cancels sending the message;
d. if the first device receives the number of lacking keys, it adjusts the register S3 or A3 provided to this end, compiles an acknowledgement of receipt of the message that transferred the keys, then marks the keys used to draft the message as being used, with these actions being concomitant, then sends the acknowledgement of receipt message, otherwise it cancels the sending procedure;
e. the first device optionally encrypts parts to be encrypted, creates and signs the message to be sent, marks as used the keys used for this creation and this signing and registers the created and signed message in a register of sent messages that have not received an acknowledgement of receipt; and
f. the first device sends the message registered in the register in the preceding step.

19. A non-transitory one or more computer-readable media comprising:
instructions that can be read by a processor of an appliance for implementing the method according to claim 1.

* * * * *